(12) United States Patent
Hikosaka et al.

(10) Patent No.: US 8,735,523 B2
(45) Date of Patent: *May 27, 2014

(54) POLYMER CRYSTALLINE MATERIALS

(75) Inventors: Masamichi Hikosaka, Hiroshima (JP);
Kaori Watanabe, Hiroshima (JP);
Kiyoka Okada, Hiroshima (JP)

(73) Assignee: Hiroshima University, Hiroshima (JP)

( * ) Notice: Subject to any disclaimer, the term of this patent is extended or adjusted under 35 U.S.C. 154(b) by 350 days.

This patent is subject to a terminal disclaimer.

(21) Appl. No.: 12/449,848

(22) PCT Filed: Feb. 27, 2008

(86) PCT No.: PCT/JP2008/053441
§ 371 (c)(1),
(2), (4) Date: Aug. 31, 2009

(87) PCT Pub. No.: WO2008/108251
PCT Pub. Date: Sep. 12, 2008

(65) Prior Publication Data
US 2010/0063235 A1    Mar. 11, 2010

(30) Foreign Application Priority Data

Mar. 2, 2007 (JP) ................................. 2007-053483
Aug. 31, 2007 (JP) ................................. 2007-226983

(51) Int. Cl.
 C08F 110/06 (2006.01)
 B29C 55/18 (2006.01)
 B29C 55/00 (2006.01)
 B29C 43/02 (2006.01)

(52) U.S. Cl.
USPC ........... 526/351; 526/352; 526/346; 526/344; 264/500

(58) Field of Classification Search
USPC .......................................... 526/351; 264/500
See application file for complete search history.

(56) References Cited

U.S. PATENT DOCUMENTS 4,234,530 A * 11/1980 Thiel et al. .................... 264/151
4,254,079 A     3/1981 Agrawal
(Continued)

FOREIGN PATENT DOCUMENTS

EP   0 135 628 A2   4/1985
EP   1 938 948      7/2008
(Continued)

OTHER PUBLICATIONS

Watanabe, K., Collection of Summaries of Lectures in the 52nd Chautaqua of Polymers, The Society of Polymer Science, Japan, Jul. 26, 2006, A-8, p. 40-42.*

(Continued)

*Primary Examiner* — Rip A. Lee
(74) *Attorney, Agent, or Firm* — Harness, Dickey & Pierce, P.L.C.

(57) ABSTRACT

One embodiment of the present invention provides polymer crystalline materials containing crystals of the polymer and satisfying the following requirements (I) and (II) or the following requirements (I) and (III): (I) the polymer crystalline materials a crystallinity of 70% or greater; (II) the crystals are 300 nm or less in size; and (III) the crystals have a number density of 40 $\mu m^{-3}$ or greater. This allows an embodiment of the present invention to provide polymer crystalline materials which are excellent in properties such as mechanical strength, heat tolerance, and transparency or, in particular, polymer crystalline materials, based on a general-purpose plastic such as PP, which is excellent in properties such as mechanical strength, heat tolerance, and transparency.

16 Claims, 20 Drawing Sheets

(56) References Cited

U.S. PATENT DOCUMENTS

| | | | |
|---|---|---|---|
| 4,380,526 A | | 4/1983 | Agrawal |
| 5,286,540 A | * | 2/1994 | Suga et al. ............... 428/36.92 |
| 5,505,900 A | * | 4/1996 | Suwanda et al. ............ 264/477 |
| 5,945,215 A | * | 8/1999 | Bersted et al. ............. 428/364 |
| 6,190,760 B1 | | 2/2001 | Nagai et al. |
| 6,203,902 B1 | * | 3/2001 | Ota et al. .................. 428/364 |
| 6,734,270 B1 | * | 5/2004 | Minami et al. ............. 526/351 |
| 7,871,548 B2 | * | 1/2011 | Hikosaka et al. ........... 264/40.7 |
| 2001/0053443 A1 | | 12/2001 | Perez et al. |
| 2004/0242103 A1 | | 12/2004 | Loos et al. |
| 2005/0182233 A1 | * | 8/2005 | Weinhold et al. ............ 528/272 |
| 2008/0063846 A1 | | 3/2008 | Loos et al. |
| 2009/0249883 A1 | | 10/2009 | Hikosaka et al. |
| 2011/0014408 A1 | | 1/2011 | Fujiwara et al. |

FOREIGN PATENT DOCUMENTS

| | | | | |
|---|---|---|---|---|
| EP | 2168997 A1 | 3/2010 | | |
| JP | 55-84635 | 6/1980 | | |
| JP | 58-185224 A | 10/1983 | | |
| JP | 60-089333 A | 5/1985 | | |
| JP | 60-097835 A | 5/1985 | | |
| JP | 60-097836 A | 5/1985 | | |
| JP | 61-193836 A | 8/1986 | | |
| JP | 63-045029 A | 2/1988 | | |
| JP | 05-092470 A | 4/1993 | | |
| JP | 07-053734 A | * | 2/1995 | ............... C08J 5/18 |
| JP | 07-243120 A | 9/1995 | | |
| JP | 09-316283 A | 12/1997 | | |
| JP | 2000-218750 A | 8/2000 | | |
| JP | 2003-041074 A | 2/2003 | | |
| JP | 2004-181782 A | * | 7/2004 | ............... B29C 55/18 |
| JP | 2005-238755 A | * | 9/2005 | ............... B29C 43/52 |
| JP | 4041885 B2 | 11/2007 | | |
| KR | 100148775 B1 | 8/1998 | | |
| TW | 431968 | 5/2001 | | |
| WO | WO 03/008190 A1 | 1/2003 | | |
| WO | WO 2007/026832 | 3/2007 | | |
| WO | WO 2008/108251 A1 | 9/2008 | | |
| WO | WO 2009/008340 A1 | 1/2009 | | |

OTHER PUBLICATIONS

JP 07-053734 A, Ishii et al. (Feb. 1995) abstract and translation in English.*
Notice of Allowance dated Apr. 20, 2011 in corresponding Korean Application No. 10-2009-7019387, with English translation.
U. Göschel et al., "Crystallization in isotactic polypropylene melts during contraction flow: time-resolved synchrotron WAXD studies"; Polymer, vol. 41, Issue 4, Feb. 2000, pp. 1541-1550.
European Search Report dated Dec. 14, 2010 issued for corresponding European Application No. EP 08712063.0.
A. Keller et al. "Oriented Crystallization in Polymers." J. Macromol. Sci. (Phys.), B1(1), 1967, pp. 41-91.
Shinichi Yamazaki et al. "Formation mechanism of shish in the oriented melt (I)-bundle nucleus becomes to shish." Polymer, 46, 2005, pp. 1675-1684.
Shinichi Yamazaki et al. "Formation mechanism of shish in the oriented melt (II)-two different growth mechanisms along and perpendicular to the flow direction." Polymer, 46, 2005, pp. 1685-1692.
K. Watanabe et al. "Acceleration Mechanism of Growth Rates under Shear Flow Due to the Oriented Melt—The Novel Morphology of Spiral Crystal." Macromolecules 39, 2006, pp. 1515-1524.
Bernhard Wunderlich et al. "Polyethylene Crystallized from the Melt under Elevated Pressure." Journal of Polymer Science part A, vol. 2, 1964, pp. 3697-3706.
M. Fujiyama. "Structure of skin layer of injection-molded polypropylene." Kobunshi Ronbunshu, Jul. 1975 vol. 32, No. 7, pp. 411-417, and English translation thereof.
Masamichi Hikosaka. "Unified theory of nucleation of folded-chain crystals and extended-chain crystals of linear-chain polymers." Polymer, vol. 28, Jul. 1987, pp. 1257-1264.
W.B. Hillig. "A deviation of classical two-dimensional nucleation kinetics and the associated crystal growth laws." Acta Metallurgica, 14, 1966, 1868-1869.
K. Watanabe. "Development of high-performance polymer materials by molding at a supercritical strain rate." Collection of Summaries of Lectures in the $52^{nd}$ Chautauqua of Polymers, The Society of Polymer Science, Japan, Jul. 26, 2006, A-8, p. 40-42, and English translation thereof.
International Preliminary Report on Patentability dated Sep. 30, 2010 in International Application No. PCT/JP2010/000317 (with English translation).
U.S. Office Action dated Dec. 21, 2009 in corresponding U.S. Appl. No. 12/065,197.
Notice of Allowance dated Jun. 24, 2010 in corresponding U.S. Appl. No. 12/065,197.
Somani, et al., "Shear-Induced Molecular Orientation and Crystallization in Isotactic Polypropylene: Effects of the Deformation Rate and Strain," *Macromolecules*, vol. 38, pp. 1244-1255 (2005).
Buerger, et al., "Crystallization of sheared polymer melts: poly(ethylene oxide) fractions," *Polymer Bulletin*, vol. 22, Nos. 5-6, pp. 593,598 (1989).
Kumaraswamy, et al., "Shear-Enhanced Crystallization in Isotactic Polypropylene. 1. Correspondence between in Situ Rheo-Optics and ex Situ Structure Determination," *Macromolecules*, vol. 32, pp. 7537-7547 (1999).
Watanabe, et al., "Mechanism of Acceleration of Growth Rate Under Shear Flow," *Polymer Prints*, Vo. 54, No. 1 (2005) (full translation).
Taiwanese Office Action dated Apr. 2, 2012 for corresponding Taiwanese Application No. 097107180 (with English translation).
International Search Report for PCT/JP2010/000317, dated Apr. 13, 2010.
International Preliminary Report on Patentability published on Nov. 25, 2010 in International Application No. PCT/JP2010/000317 (with English translation).
U.S. Office Action dated Jun. 24, 2010 in corresponding U.S. Appl. No. 12/065,197.
Buerger, et al., "Crystallization of sheared polymer melts: poly(ethylene oxide) fractions," *Polymer Bulletin*, vol. 22, Nos. 5-6, pp. 593-598 (1989).
Watanabe, et al., "Mechanism of Acceleration of Growth Rate Under Shear Flow," *Polymer Preprints*, Vo. 54, No. 1 (2005) (full translation).
Japanese Office Action mailed Jun. 18, 2013, issued in Japanese Application No. 2009-502539 (with English translation).
Andrew J. Lovinger, et al., "*Studies on the α and β Forms of Isotactic Polypropylene by Crystallization in a Temperature Gradient,*" Journal of Polymer Science: Polymer Physics Edition, vol. 15, pp. 641-656 (1977).
Office Action dated Feb. 28, 2013, issued in U.S. Appl. No. 13/138,212
U.S. Office Action mailed Sep. 19, 2013 for U.S. Appl. No. 13/138,212.

* cited by examiner (a)

(b)

(c)

(a)

(b)

(c)

100μm

POLYMER CRYSTALLINE MATERIALS

TECHNICAL FIELD

The present invention relates to polymer crystalline materials excellent in properties such as mechanical strength, heat tolerance, and transparency.

BACKGROUND ART

So-called "general-purpose plastics" such as polyethylene (hereinafter referred to as "PE"), polypropylene (hereinafter referred to as "PP"), polystyrene (hereinafter referred to as "PS"), and polyvinyl chloride (hereinafter referred to as "PVC") are commonly used as materials for various daily-use products (such as bags, various wrappings, various containers, and sheets) and materials for industrial parts of automobiles and electrical products, daily necessities, miscellaneous goods, and the like, not only because they are available at very low prices of ¥100 or less per kilogram, but also because they are easy to mold and lighter in weight than metal and ceramics (one severalth the weight of metal or ceramics).

However, the general-purpose plastics suffer from such drawbacks as insufficient mechanical strength and low heat tolerance. As such, the general-purpose plastics do not sufficiently posses properties required of materials for use in various industrial products, e.g., mechanical products such as automobiles and electrical, electronic, and information products. Therefore, the general-purpose plastics are currently limited in scope of application. For example, PE typically has a softening temperature of approximately 90° C. Further, PP, which is considered to be comparatively high in heat tolerance, typically softens at 130° C. or less. Moreover, since PP is insufficient in transparency in comparison with polycarbonate (hereinafter referred to as "PC") and polyethylene terephthalate (hereinafter referred to as "PET") and PS, it suffers from such a drawback that it cannot be used as optical materials, bottles, or transparent containers.

On the other hand, so-called "engineering plastics" such as PET, PC, fluoroplastics (e.g., Teflon (registered trademark)), nylon, polymethylpentene, and an acrylic resin are excellent in mechanical strength, heat tolerance, transparency, and other properties, and typically do not soften at 150° C. Therefore, the engineering plastics are used as various industrial product materials and optical materials, which are required of high performance, for automobiles, mechanical products, and electrical products. However, the engineering plastics suffer from serious drawbacks. For example, they are sold at very high prices of several hundred yen per kilogram to several thousand yen per kilogram. Further, the engineering plastics are very environmentally unfriendly because it is difficult or impossible to convert them back into monomers for recycling.

Therefore, if the material properties such as mechanical strength, heat tolerance, and transparency of the general-purpose plastics are so dramatically improved that the general-purpose plastics can replace the engineering plastics and even metal materials, it becomes possible to greatly reduce costs of various industrial products and daily-use products made of polymers and metals, greatly save energy through a reduction in weight, and improve user-friendliness. For example, if PP becomes able to replace PET which is currently used as bottles for beverages such as soft drinks, it becomes possible to greatly reduce costs of bottles. Moreover, since it is possible but is not easy to recycle PET into monomers, used PET bottles are cut, reused once or twice for low-quality applications such as clothing fibers and films, and then discarded. Meanwhile, easiness of recycling PP into monomers allows complete recycle of PP, thus bringing about merit that makes it possible to reduce the consumption of fossil fuels such as oil and the generation of carbon dioxide ($CO_2$).

In order to improve the properties such as mechanical strength, heat tolerance, and transparency of the general-purpose plastics so that the general-purpose plastics can replace the engineering plastics and metals, it is necessary to remarkably increase the proportion of crystals in PP or PE (crystallinity), or more preferably, to prepare a crystalline substance that is purely crystalline and contains not much amorphous PP or PE. In particular, PP has the advantage of being higher in mechanical strength and heat tolerance than PE. Therefore, PP is a very promising, important polymer that has been maintained at high annual rates of increase in production of several percent.

One method known to improve the crystallinity of a polymer is to cool a melt of the polymer at a slow rate. This method, however, cannot sufficiently increase the crystallinity at all. Further, this method causes significant deterioration in productivity of products, and this method also increases crystal grain size to a bulky size, thus causing a decrease in mechanical strength. Another method proposed to increase the crystallinity is to cool the melt of the polymer under high pressure. This method, however, requires pressing of the melt of the polymer at several hundred atm or greater. Thus, this method is only experimentally possible, but not feasible in industrial production due to complicate production apparatus design and high production cost. Thus, this method is difficult to adopt practically. Another method known to improve the crystallinity of the polymer is to add a nucleating agent to the polymer melt. However, this method currently suffers from such drawbacks (a) inevitable contamination of the nucleating agent as impurities, (b) an insufficient increase in crystallinity, and an increase in cost due to the nucleating agent being much higher in cost than the resin. In conclusion, there is currently no method completed to dramatically improve the crystallinity of a polymer such as a general-purpose plastic and to produce a crystalline substance of a polymer.

Incidentally, many studies have shown that the polymer melt (isotropic melt) in which molecular chains take random conformation (so called "random coil") is crystallized under shear flow to sparsely generate a combination of shish crystal form and kebab crystal form in the polymer melt (see Non-patent Literature 1). The shish crystal form is a fiber-like crystal of several μm in thickness and is oriented along the flow. The kebab crystal form is a lamination of thin-film crystal and amorphous skewered through the shish crystal form. This form is referred to as "shish-kebab, meaning "skewer" and "meat" of skewered grilled-chicken (Japanese "Yakitori")".

In the production of shish-kebab form, only the shish form is created locally in an initial period. The shish form has an Extended Chain Crystal (ECC) structure in which straightly-elongated molecular chains are crystallized (see Non-patent Literature 5). On the other hand, the crystal portion of the kebab form has a Folded Chain Crystal (FCC) structure in which the molecular chains are folded at a surface of the thin-film crystal. How the shish-kebab form is produced has not been explained in terms of molecular theory, because it has not been studied kinetically. The FCC is a thin-film crystal (called a lamellar crystal) which is most widely seen among polymer crystals. Moreover, it is widely known that injection molding forms a "skin" (which is a thin crystalline film of several hundred μm thickness) on surface, and a "core" inside. The core is an aggregate of "laminated structures (laminated lamellar structures)" in which a folded chain crystal and amorphous are laminated. (see Non-patent Literature 6). The skin is formed from shish-kebab form, but the shish is formed only sparsely. Production mechanism of the skin structure has been totally unknown in the lack of kinetic study thereon.

The inventors of the present invention are pioneers to study the production mechanism of the shish form kinetically, and found the mechanism of the local formation of the shish form in the melt: at a boundary with heterogeneity, some molecular chains in the melt attain liquid crystal orientation because the molecular chains are elongated due to "topological interaction" with the boundary, and the melt become "Oriented melt" (e.g., see Non-patent Literatures 2 and 3). Here, the "topological interaction" is an effect that "string-like polymer chains characterized by a one-dimensional topology (mathematical topology) pull each other and slide on each other under flow field because they are entangled". The topological interaction is well-known as a characteristic interaction among polymers. The inventors of the present invention are first to report a theory of the topological crystallization mechanism of polymers, explaining how the ECC and FCC are formed. This theory is called "sliding diffusion theory" and recognized worldwide (see Non-patent Literature 7).

Moreover, the inventors of the present invention discovered the mechanism of generation of a "spiralite" during the crystallization of a polymer at a low shear strain rate of 0.01 to 0.1 $s^{-1}$ under a shear flow field, clarified the mechanism of generation, and thus became the first to experimentally verify that molecular chains are elongated at a boundary with heterogeneity to form the oriented melt, thereby advocating a universal mechanism in which nucleation and growth speed are remarkably accelerated (see Non-patent Literature 4).

Consequently, it can be said that the crystallization of a polymer will be facilitated and the crystallinity thereof can be enhanced if the polymer melt can be turned wholly into the oriented melt. The "polymer melt turned wholly into the oriented melt" here is referred to as "bulk oriented melt". Furthermore, it is expected that if the polymer melt can be wholly crystallized while being kept as the oriented melt, a crystalline substance in which a majority of molecular chains of the polymer are oriented (such a crystalline substance being referred to as bulk "oriented polymer crystalline materials") can be produced. In this case, the nucleation is facilitated remarkably and changed drastically into "homogeneous nucleation" by which an indefinitely large number of nuclei are formed between molecular chains without addition of a nucleating agent. This eliminates impurity contamination and allows the crystal size to be on the order of nanometers. It is also expected that this leads to polymers with high transparency and dramatic improvement in mechanical strength and heat tolerance. The term "homogeneous nucleation" here means a case where according to a well-known classical theory of nucleation, nucleation spontaneously occurs without the aid from a foreign material such as a nucleating agent (see Non-patent Literature 8). On the other hand, a case where nucleation occurs on a surface a foreign body such as a nucleating agent with the aid of the foreign body is called "heterogeneous nucleation". Conventionally, crystallization of every substance from the bulk melt has been "heterogeneous nucleation".

CITATION LIST

Non-patent Literature 1
A. Keller, M. J. Machin, *J. Macromol. Sci., Phys., B*2, 501 (1968)

Non-patent Literature 2
S. Yamazaki, M. Hikosaka et al., *Polymer,* 46, 2005, 1675-1684.

Non-patent Literature 3
S. Yamazaki, M. Hikosaka et al., *Polymer,* 46, 2005, 1685-1692.

Non-patent Literature 4
K. Watanabe et al., *Macromolecules,* 39(4), 2006, 1515-1524.

Non-patent Literature 5
B. Wunderlich, T. Arakawa, *J. Polym. Sci.,* 2, 3697-3706 (1964)

Non-patent Literature 6
M. Fujiyama, "Structure of Skin Layer of Extruded Polypropylene", *Polymer Preprints,* 32(7), pp. 411-417 (1975)

Non-patent Literature 7
M. Hikosaka, *Polymer,* 1987, 28, 1257-1264

Non-patent Literature 8
W. B. Hillig, *Acta Metallurgica,* 14, 1966, 1868-1869

SUMMARY OF INVENTION

As described above, there is currently no known method for producing a crystalline substance with a dramatic improvement in the crystallinity of a polymer such as a general-purpose plastic, and such polymer crystalline materials have not been obtained yet. In view of this, the present invention has as an object to provide polymer crystalline materials excellent in properties such as mechanical strength, heat tolerance, and transparency or, in particular, polymer crystalline materials, based on a general-purpose plastic such as PP, which is excellent in properties such as mechanical strength, heat tolerance, and transparency.

As described above, it is theoretically expected that bulk oriented polymer crystalline materials can be obtained by preparing the bulk oriented melt from the polymer melt and then crystallizing the oriented melt. Non-patent Literatures 2 and 3 disclose a critical strain rate ("critical shear strain rate γ*") at which the oriented melt can be produced partly under shear flow. However, the bulk oriented melt cannot be produced by applying shear to the polymer melt at a strain rate equal to or greater than the critical shear strain rate, which produces the oriented melt only partly in the vicinity of the boundary with the heterogeneity. (In this case, the strain rate is a critical strain rate under shear deformation, that is, under shear flow. Meanwhile, the after-mentioned ε* is a critical strain rate under elongation flow.) Here, γ*=approximately 0.3 $s^{-1}$, which is smaller by one digit than the after-mentioned ε*=approximately several tens of $s^{-1}$. Thus, the bulk oriented polymer crystalline materials cannot be obtained even if the information based on the critical shear strain rate recited in the Non-patent Literatures is used. That is, no method has not been established, which determines the critical strain rate (critical elongation strain rate), which can straighten the polymer in the polymer melt to give the bulk oriented melt. Moreover, even if the critical elongation strain rate can be determined, the critical elongation strain rate varies depending on type of the polymer, polymerization rate of the polymer, and molecular weight distribution in the polymer, and entangling density, melting temperature, and the like. Thus, the critical elongation strain rate should be determined for each polymer. Accordingly, at this moment, the bulk oriented polymer crystalline materials cannot be produced by applying the techniques described above.

As a result of diligent studies to solve the aforementioned problems, the inventors of the present invention uniquely developed a Compression-type crystallization apparatus which can determine the critical elongation strain rate of the polymer melt which has been difficult to determine. The apparatus makes it possible to prepare the bulk oriented melt by elongating the polymer melt and ultimately to improve the crystallinity of a polymer and produce bulk oriented polymer crystalline materials. Moreover, the bulk oriented polymer crystalline materials obtained by the method were polymer crystalline materials excellent in properties such as mechanical strength, heat tolerance, and transparency. That is, the present invention can be said to have been completed by establishing the method for producing oriented polymer crystalline materials. However, the present invention is not limited to oriented polymer crystalline materials produced by the method. The present invention encompasses the following inventions.

Polymer crystalline materials according to the present invention is polymer crystalline materials comprising crystals of the polymer and satisfying the following requirements (I) and (II): (I) the polymer crystalline materials have a crystallinity of 70% or greater; and (II) the crystals are 300 nm or less in size. It should be noted here that the crystallinity of the polymer crystalline materials can be measured by the wide-angle X-ray scattering method (WAXS method), the density method, and the thermal measurement method. Further, the size of the crystals is measured by the optical microscopic method, the small-angle X-ray scattering method (SAXS method), and the WAXS method.

Further, since Number Density $\nu$ ($\mu m^{-3}$)=Crystal Size $D^{-3}$, polymer crystalline materials according to the present invention can also be said to be polymer crystalline materials comprising crystals of the polymer and satisfying the following requirements (I) and (III): (I) the polymer crystalline materials have a crystallinity of 70% or greater; and (III) the crystals have a number density of 40 $\mu m^{-3}$ or greater. It should be noted that the crystallinity of the polymer crystalline materials can be measured, for example, by the wide-angle X-ray scattering method (WAXS method), the density method, and the thermal measurement method. Further, the number density of the crystals can be calculated from the crystal size measured by the optical microscopic method, the small-angle X-ray scattering method (SAXS method), and the WAXS method.

The polymer crystalline materials are very high in crystallinity: 70% or greater (preferably 80% or greater, or more preferably 90% or greater), very small in crystal size: 300 nm or less (preferably 100 nm or less, or more preferably 50 nm or less), and high in crystal number density: 40 $\mu m^{-3}$ (preferably $10^3$ $\mu m^{-3}$ or greater, or more preferably $10^4$ $\mu m^{-3}$ or greater). Further, the polymer crystalline materials have a tensile strength of 0.18 GPa or greater (or preferably 0.2 GPa or greater), measured by a tensile testing method, and a Young's modulus of 1 GPa or greater (or preferably 1.2 GPa or greater). Further, the polymer crystalline materials have a transparency (haze, thickness of 10 $\mu m$) of 0.25 or less (or preferably 0.20 or less), measured by a transmitted light intensity measurement method. Further, in cases where the polymer crystalline materials are polypropylene, the polymer crystalline materials have an allowable temperature limit of 135° C. or greater, preferably 145° C. or greater, or more preferably 150° C. or greater, measured by a method for directly reading the size of a test piece with use of an optical microscope. Therefore, the polymer crystalline materials are superexcellent in properties such as mechanical strength, heat tolerance, and transparency.

It is preferable that the polymer be a general-purpose plastic or, in particular, polypropylene. Since a general-purpose plastic is inexpensive, it is of great significance to use it as an alternative to metal or the like by imparting properties such as high mechanical strength thereto. Further, since PP can be recycled into monomers, it can be a very environmentally friendly material.

Further, it is preferable that the polymer crystalline materials be polymer crystalline materials that are obtainable by a production method comprising the steps of: (i) putting the polymer melt into an oriented melt state by elongating the polymer melt at a strain rate equal to or greater than a critical elongation strain rate; and (ii) crystallizing the polymer melt while keeping the polymer melt in the oriented melt state.

The production method may be a method including the step of determining the critical elongation strain rate of the polymer melt. It should be noted here that the step of determining the critical elongation strain rate of the polymer melt may be a step of sandwiching the disk-shaped polymer melt having a radius of $x_0$ and a thickness of $2z_0$ between transparent plates, cooling the polymer melt to a supercooled state, causing the transparent plates to press the polymer melt at a constant rate v in a thickness direction, measuring the radius x* of a critical point at which the polymer melt becomes an oriented crystal, and calculating the critical elongation strain rate $\epsilon^*$ from the equation $\epsilon^* = \alpha x^{*2}$, where $\alpha = v/2x_0^2 z_0$), or may be a step of measuring the thickness 2z* of a critical point at which the polymer melt becomes an oriented crystal and calculating the critical elongation strain rate $\epsilon^*$ from the equation $\epsilon^* = (v/2) z^{*-1}$.

Further, the step of determining the critical elongation strain rate may include the steps of sandwiching the constant-width plate-shaped polymer melt having a center distance of $x'_0$ and a thickness of $2z_0$ between transparent plates, cooling the polymer melt to a supercooled state, causing the transparent plates to press the polymer melt at a constant rate v in a thickness direction, measuring the center distance x'* of a critical point at which the polymer melt becomes an oriented crystal, and calculating the critical elongation strain rate $\epsilon^*$ from the equation $\epsilon^* = \alpha x'^*$, where $\alpha = v/(x'_0 z_0)$.

According to the production method, the elongation of the polymer melt at the strain rate equal to or greater than the critical elongation strain rate causes the polymer melt to become the oriented melt, and if the polymer melt is crystallized while the polymer melt is in the state of the oriented melt, a polymer bulk oriented crystalline substance (referred to also as "oriented polymer crystalline materials") can be obtained, whereby desired polymer crystalline materials can be easily obtained. In this case, the polymer melt may be the polymer melt supercooled below an equilibrium melting point, or may be the polymer melt that is above the equilibrium melting point. The term "equilibrium melting point" here means a thermodynamic melting point.

Further, in cases where the polymer crystalline materials according to the present invention are polymer crystalline materials produced by the production method, it is preferable that the polymer melt be the general-purpose plastic melt or, in particular, the polypropylene melt. In particular, it is more preferable that the polymer melt be the isotactic polypropylene melt.

According to the method, it is possible to obtain oriented polymer crystalline materials of a general-purpose plastic or even oriented polymer crystalline materials of polypropylene. The oriented polymer crystalline materials of a general-purpose plastic and the oriented polymer crystalline materials of polypropylene are improved in properties such as heat tolerance and mechanical strength, and are highly transparent because the size of their crystal molecules is on the order of nanometers. The term "mechanical strength" here means overall strength such as breaking strength, rigidity, and toughness. Moreover, it is more preferable that the polypropylene is isotactic polypropylene in which methyl groups are oriented in one direction, because this further improves crystallinity, thereby improving the properties. This makes it possible to use polypropylene in various industrial parts of automobiles, electronic products, and the other products, to which polypropylene has not been applicable conventionally due to its poor mechanical strength, heat tolerance, etc. This can make a significant reduction in the cost of the industrial parts, etc. Moreover, as described above, monomer recycle of PP is easy. Thus, the use of PP lowers the consumption of fossil fuels, thereby contributing to $CO_2$ reduction, which is worked on worldwide.

Further, the present invention encompasses a molded article of the polymer crystalline materials, an extrusion molded article of the polymer crystalline materials, an injection molded article of the polymer crystalline materials, and a blow molded article of the polymer crystalline materials. Furthermore, in the present invention, the polymer crystalline materials may be fibrous.

For a fuller understanding of the nature and advantages of the invention, reference should be made to the ensuing detailed description taken in conjunction with the accompanying drawings.

Figure 1:
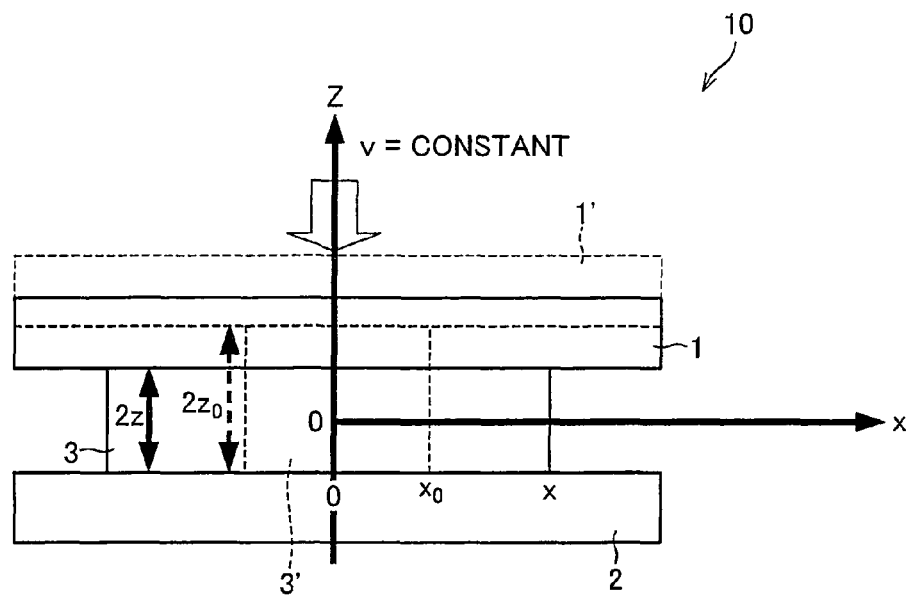
FIG. 1 is a schematic view showing a Compression-type crystallization apparatus for use in determination of the critical elongation strain rate of the polymer melt.

REFERENCE SIGNS LIST 1, 1' Upper transparent plate
2, 2' Lower transparent plate
3 Polymer melt
10 Compression-type crystallization apparatus

DESCRIPTION OF EMBODIMENTS

One embodiment of the present invention is described below. It should be noted that the present invention is not limited thereto and can be modified in various ways within the scope thereof recited below.

<1. Polymer Crystalline Materials According to the Present Invention>

Polymer crystalline materials according to the present invention are polymer crystalline materials comprising crystals of the polymer and satisfying the following requirements (I) and (II):

(I) the polymer crystalline materials have a crystallinity of 70% or greater; and (II) the crystals are 300 nm or less in size.

As stated previously, since the number density $\nu$ ($\mu m^{-3}$) equals the crystal size $D^{-3}$, the polymer crystalline materials according to the present invention can also be said to be polymer crystalline materials comprising crystals of the polymer and satisfying the following requirements (I) and (III):

(I) the polymer crystalline materials have a crystallinity of 70% or greater; and (III) the crystals have a number density of 40 $\mu m^{-3}$ or greater.

The polymer is not particularly limited, but may be a so-called general-purpose plastic (e.g., polyethylene (PE), polypropylene (PP), polystyrene (PS)), or may be a so-called engineering plastic (e.g., polyethylene terephthalate (PET), nylon, a fluorocarbon resin such as Teflon (registered trademark)). It is preferable to apply a general-purpose plastic to a production method of present invention, because it can improve the general-purpose plastic of low cost in terms of properties such as mechanical property, heat tolerance, and transparency and allow the general-purpose plastic to replace the engineering plastic, thereby significantly reducing the cost of industrial resin parts etc. Further, PP is preferable among the general-purpose plastics, because PP is higher in heat tolerance and mechanical strength than the other general-purpose plastics. Moreover, among PP, isotactic polypropylene (hereinafter referred to as "iPP" where appropriate) is especially preferable. This is because iPP has good crystallinity due to its structure in which methyl groups are oriented in one direction. Thus, it is easy to obtain oriented polymer crystalline materials from iPP. Moreover, the oriented polymer crystalline materials prepared from iPP can attain finer crystal molecules more easily than that prepared from normal PP. Thus, the oriented polymer crystalline materials prepared from iPP have a higher transparency than those prepared from normal PP.

The polymer crystalline materials according to the present invention only need to contain crystals of a polymer, and may contain amorphous. Further, in particular, the polymer crystalline materials of the present invention are preferably, but are not limited to, an aspect that contains no impurities such as a nucleating agent (i.e., "nucleating-agent-free polymer crystalline materials"). Since homogenous nucleation occurs in the polymer crystalline materials according to the present invention, the polymer crystalline materials according to the present invention are polymer crystalline materials having an excellent mechanical strength even without containing a nucleating agent. The absence of a nucleating agent makes it possible to prevent a cost increase from being caused by using a nucleating agent much more expensive than polymer crystalline materials. The term "nucleating agent" here means a substance that serves as the nucleus for the formation of a crystal, and is a collective term for substances that are added to increase the crystallinity.

Further, the polymer crystalline materials of the present invention may be composed of a single polymer or a mixture of plural types of polymer. For example, PP, PE, and first-class polybutene can be appropriately combined. A combination of plural types of polymer makes it possible to make up for a defect in properties of one polymer with another polymer. The blend ratio of one polymer to another may be set appropriately for any purpose.

An aspect of the polymer crystalline materials according to the present invention has a crystallinity of 70% or greater, preferably 80% or greater, or more preferably 90% or greater. The term "crystallinity of polymer crystalline materials" here means the proportion of crystals in the polymer crystalline materials (i.e., polymer solid). The crystallinity of polymer crystalline materials can be measured by a publicly-known method such as the wide-angle X-ray scattering method (WAXS method), the density method, or the thermal measurement method. For example, the crystallinity can be determined by the density method with water and ethyl alcohol (see L. E. Alexander, "*Kobunshi no Ekkusu-sen Kaisetsu (Jyo)*" (X-ray Diffraction of Polymers (I)), Kagakudojin, 1973, p. 171). The crystallinity $x_c$ of polymer crystalline materials is calculated by the following equation:

$$\chi_c = \frac{\rho_c}{\rho}\left(\frac{\rho - \rho_a}{\rho_c - \rho_a}\right) \quad [\text{Math. 1}]$$

In the above equation, $\rho$ is the crystal density of a sample, $\rho_a$ is the amorphous density, and $\rho_c$ is the crystal density. Further, $\rho_a$ and $\rho_c$ can take on values used in a document (see Qirk R. P. and Alsamarriaie M. A. A., Awiley-interscience publication, New York, *Polymer Handbook*, 1989, p. V/24). For example, according to the *Polymer Handbook*, the crystal density and amorphous density of iPP are $\rho_a=0.855$ (g/cm$^3$) and $\rho_c=0.936$ (g/cm$^3$), respectively.

Measurement of the crystallinity of polymer crystalline materials by the wide-angle X-ray scattering method (WAXS method) may be performed as described in Example 2.

Further, measurement of the crystallinity of polymer crystalline materials by the thermal measurement method can be performed as described in "*Shin Kobunshi Jikkengaku 8 Kobunshi no Bussei (1) Netsuteki Rikigakuteki Seishitsu* (New Experimental Studies on Polymers 8 Properties of Polymers (1) Thermal and Kinetic Properties), The Society of Polymer Science, Japan Ed., p. 45-213, Kyoritsu Shuppan Co., Ltd., 1997". The thermal measurement method can be performed, for example, with use of a differential scanning calorimetry (DSC) apparatus. The crystallinity $\chi_c$ is calculated by the following equation:

$$\chi_c(\%) = \Delta H_m \div \Delta H_m^0 \times 100$$

where $\Delta H_m$ is the melting heat of a sample as actually measured by the DSC apparatus and $\Delta H_m^0$ is the equilibrium melting heat. $\Delta H_m^0$ can take on a value used in a document (see Qirk R. P. and Alsamarriaie M. A. A., Awiley-interscience publication, New York, *Polymer Handbook*, 1989, p. V/23). For example, according to the *Polymer Handbook*, $\Delta H_m^0=8.7$ (kJ/mol) in the case of iPP.

Further, in an aspect of the polymer crystalline materials according to the present invention, the crystals contained in the polymer crystalline materials have a size D of 300 nm or less, preferably 100 nm or less, more preferably 50 nm or less, still more preferably 30 nm or less, or still more preferably 20 nm or less. The size D of the crystals can be measured by the publicly-known optical microscopic method, the small-angle X-ray scattering method (SAXS method), and the wide-angle X-ray scattering method (WAXS method).

The optical microscopic method can be performed as described in "H. Awaya, *Kobunshi Sozai no Henko Kenbikyo Nyumon* (Introduction of Polarizing Microscope for Polymer Materials, Agne Gijutsu Center Co., Ltd. p. 1-255, 2001". For example, the size of the crystals can be measured by using a scale calibrated by a micrometer caliper.

The X-ray scattering method can be performed, for example, by the small-angle X-ray scattering method (SAXS method) or the wide-angle X-ray scattering method (WAXS method). Examples of experimental facilities to which the X-ray scattering method can be applied include SPring-8, Beam Line BL40B2 run by Japan Synchrotron Radiation Research Institute (JASRI) and Photon Factory (PF), Beam Line BL10C run by High Energy Accelerator Research Organization (KEK). Further, the frequency ($\lambda$) of an X-ray for use in detection is, for example, $\lambda=0.072$ nm or $\lambda=0.15$ nm. As a detector, an Imaging Plate, a position-sensitive detector (PSPC), or the like can be used.

Further, since, in the SAXS method, the primary peak of a curve of the SAXS intensity ($I_x$) against the scattering vector (q) corresponds to the shortest distance between microcrystals (=crystal size D) in cases where microcrystals of the average size D are randomly packed (see A. Guinier, "*Ekkusu-sen Kessyogaku no Riron to Jissai*" (Theory and Practice of X-ray Crystallography), Rigaku Corporation, p. 513, 1967), the crystal size D is calculated by the Bragg equation:

$$D = 2\pi \div q.$$

Further, in an aspect of the polymer crystalline materials according to the present invention, the crystals contained in the polymer crystalline materials have a number density $\nu$ of 40 $\mu m^{-3}$ or greater, preferably $10^3$ $\mu m^{-3}$ or greater, more preferably $10^4$ $\mu m^{-3}$ or greater, particularly preferably $10^5$ $\mu m^{-3}$ or greater. The number density $\nu$ can be calculated by the following equation:

$$\text{Number Density } \nu(\mu m^{-3}) = \text{Crystal Size } D^{-3}.$$

According to Hall-Petch's law (see *Nano Materiaru Kogaku Taikei* (Handbook for Nanomaterials), Vol. 2, Nano Kinzoku (Nanometals), Fujitec Corporation, 2005, p. 20), it is known that the strength of a crystal increases in proportion to the inverse of the square root of the crystal size D. Therefore, it can be easily understood that the strength of the polymer crystalline materials according to the present invention has been remarkably improved. For example, in cases where the crystal size D changes from 1 µm to 10 nm, the strength increases tenfold ($\sqrt{100}=10$).

Further, since the half width w of reflection by a crystal face in a curve of the WAXS intensity ($I_x$) against the scattering vector (q) corresponds to the domain size (referred to also as "coherent size") (D') in crystals of the average size D (see I. Nitta, *Ekkusu-sen Kessyogaku* (X-ray Crystallography), Maruzen Co., Ltd., p. 513, 1961), measurement of the crystal size D of polymer crystalline materials by the WAXS method can be performed by an analysis of the following half width w. The domain size D' is calculated by Scherrer's equation below:

$$D' = 0.9\lambda \div w \cos \theta$$

where $\theta$ is the full width at half maximum of a scattering angle. Normally, the average size D is calculated on the assumption that D=D'.

The polymer crystalline materials according to the present invention have a tensile strength of 0.18 GPa or greater (or preferably 0.2 GPa or greater), measured by a tensile testing method, and a Young's modulus of 1 GPa or greater (or preferably 1.2 GPa or greater). The tensile testing method can be performed by stretching a test piece with a tensile testing apparatus. The tensile testing apparatus used in measurement is a Shimadzu's precision universal tester (Autograph AG-1kNIS), and the test piece used has the dimensions 2 mm (long)×0.5 mm (wide)×15 µm (thick). For details of the tensile testing, refer to the description of Examples below.

Further, the Young's modulus (longitudinal elastic modulus) is a constant that determines the value of strain with respect to stress within a range of elasticity.

$$[\text{Strain } \epsilon] = [\text{Stress } \sigma] / [\text{Young's Modulus } E] \text{ (Hooke's law)}$$

The Young's modulus can be calculated from the amount of strain with respect to one-way stretching or the direction of compression stress, and corresponds to the slope of a linear portion of a stress-strain curve whose vertical axis represents stress and whose horizontal axis represents strain. For details of how to calculate the Young's modulus, refer to the description of Examples below. It should be noted that the tensile strength and the Young's modulus were measured at 22° C.

Further, a 10-µm-thick test piece of the polymer crystalline materials according to the present invention has a transparency (haze, thickness of 10 µm) of 0.25 or less (or preferably 0.2 or less), measured by a transmitted light intensity measurement method. This method was devised by the inventors of the present invention. In the description of the present invention, the term "transparency (haze, thickness of 10 µm)" means "haze measured with use of a 10-µm-thick test piece". The transmitted light intensity measurement method is performed by measuring the amount of light transmitted through the test piece. Examples of apparatuses applicable to the transmitted light intensity measurement method encompass an apparatus including an optical microscope (BX51N-33P; manufactured by Olympus Optical Co., Ltd.) using a halogen lamp as a white light source, a CCD camera (CCD VIDEO Camera DXC-9000; manufactured by Sony Corporation) and image analysis software (Image-Pro PLUS; manufactured by Media Cybernetics). White light serving as measuring light is made incident on the test piece in such a manner as to form a circle having a diameter of 1 mm.

In cases where the polymer crystalline materials according to the present invention are polypropylene, the polymer crystalline materials have an allowable temperature limit of 135° C. or greater, preferably 145° C. or greater, or more preferably 150° C. or greater, measured by a method for directly reading the size of a test piece with use of an optical microscope. The method for directly reading the size of a test piece is a method uniquely devised by the inventors of the present invention, and the allowable temperature limit can be measured as described in the following description. The apparatuses used in measurement are a CCD camera-equipped optical microscope (BHS-751-P; manufactured by Olympus Optical Co., Ltd.) and a hot stage (L-600A; manufactured by Linkam), and the test piece used has the dimensions 1 mm (long)×1 mm (wide)×15 µm (thick). The test piece was heated at a temperature rising rate of 1 K/minute, and the temperature at which the test piece contracted by 2% in a longitudinal direction or in transverse direction was taken as the allowable temperature limit. For details of the method for directly reading the size of a test piece, refer to the description of Example below.

<2. Method for Producing Polymer Crystalline Materials According to the Present Invention>

The following description describes, as an example of a method for producing polymer crystalline materials of the present invention, a method for producing oriented polymer crystalline materials which method was uniquely developed by the inventors of the present invention. However, the present invention is not limited to this.

By crystallizing the polymer melt while it is in the state of oriented melt, the molecular chains contained in the oriented melt are associated with each other. This leads to nucleation and crystal growth remarkably at an accelerated pace without assistance of heterogeneity, whereby the oriented polymer crystalline materials can be produced.

Generally, in the melt of polymer (referred to as "polymer melt"), the polymer molecular chains are present with random and isotropic form (for example, in a random coil form). Such a polymer melt is referred to as "isotropic melt". Application of external force such as shearing force, elongation, etc. to the isotropic melt straightens the polymer molecular chains. The straightened polymer molecular chains go back to the random state by entropic relaxation thermodynamically. If the external force is applied at a strain rate equal to or greater than a certain level, the application overrules the entropic relaxation that causes the molecular chains to return to the random state. As a result, the melt with high orientation of the molecular chains is obtained (which is called as "oriented melt"). The strain rate at which the polymer isotropic solution can be turned to the oriented melt is called "critical strain rate". Especially, the critical strain rate at which the polymer melt is turned to the bulk oriented melt by elongating the polymer melt is called "critical elongation strain rate".

Therefore, the production of the bulk oriented polymer crystalline materials requires elongation of the polymer melt at a strain rate equal to or greater than the critical elongation strain rate. However, a method and means for determining the critical elongation strain rate have not been established. In the following, a "step of determining the critical elongation strain rate" is explained, which can determine the critical elongation strain rate of the polymer melt and which is preferably included in the method for producing oriented polymer crystalline materials. The method for producing oriented polymer crystalline materials may or may not include this "step of determining the critical elongation strain rate".

(2-1: Step of Determining the Critical Elongation Strain Rate)

The inventors of the present invention uniquely developed a Compression-type crystallization apparatus, which can determine the critical elongation strain rate. This crystallization apparatus makes it possible to directly observe the elongation-based crystallization of the polymer melt with use of an optical microscope. A structure of the crystallization apparatus is explained referring to the schematic view of FIG. 1. A crystallization apparatus 10 includes a pair of transparent plates (upper transparent plate 1 and a lower transparent plate 2). The temperature of the transparent plates can be appropriately controlled by temperature controlling means (not illustrated). The transparent plates can be made of any material, provided that they are so transparent that a polymer sample sandwiched therebetween can be observed by the optical microscope. However, the transparent plates should sandwich the polymer melt of a high temperature. Thus, it is preferable that the transparent plates be made of a highly heat-tolerant material such as glass, quartz, sapphire, or diamond. Moreover, it is preferable that the transparent plates have a flat surface.

Next, how to determine the critical elongation strain rate of the polymer melt by using the crystallization apparatus 10 is explained below. Firstly, the disk-shaped polymer melt (sample) 3' is placed on the lower transparent plate 2, and then sandwiched between the upper transparent plate 1 and the lower transparent plate 2. Then, they are set in a polarizing microscope to observe the crystallization process directly. Then, the sample is rapidly cooled (cooling rate: 30° C./min or faster) to a constant temperature (crystallization temperature) at which the polymer melt (sample) is kept supercooled (supercooling degree $\Delta T$: 20 K or greater, for example, in case of polypropylene). Then, the upper transparent plate 1 is moved toward the lower transparent plate 2 at a constant rate (rate: 0 to 70 mm/s or faster), thereby pushing the polymer melt (sample) 3' in a thickness direction at a constant rate (as an alternative, the lower transparent plate 2 may be moved toward the upper transparent plate 1). Whether, in the polymer melt (sample) 3 thus crystallized, a portion in which the polymer melt is turned into the oriented melt and then crystallized to oriented polymer crystalline materials is judged by measuring the crystal size D. If the crystal size D is 300 nm or less, it can be judged that the polymer melt has been turned into the oriented polymer crystalline materials. If the crystal size D exceeds 300 nm, it can be judged that the polymer melt has not been turned into the oriented polymer crystalline materials. In other words, a critical point at which the polymer melt is turned into the oriented polymer crystalline materials is determined by a result of study of the crystal size D.

Referring to FIG. 1, the method for determining the critical elongation strain rate of the polymer melt is explained more specifically. The polymer melt 3' indicated by the broken line in FIG. 1 is the polymer melt yet to be pressed by the transparent plates (upper transparent plate 1 and the lower transparent plate 2). On the other hand, in FIG. 1, the polymer melt 3 indicated by the solid line is the polymer melt pressed by the transparent plates (upper transparent plate 1 and the lower transparent plate 2). In FIG. 1, the upper transparent plate 1' indicated by the broken line is the upper transparent plate before the polymer sample 3' is pressed and the location thereof. Moreover, the reference numeral "0" indicates a center point of the disk-shaped polymer sample.

It is put that the thickness direction is a direction from the lower transparent plate 2 to the upper transparent plate 1 (the z-axis direction in FIG. 1), and a distance between the transparent plates between which the disk-shaped polymer melt 3 is sandwiched is the thickness of the disk-shaped polymer melt. Moreover, a distance from the center of the disk made of the polymer melt 3 is the radius.

Where the polymer melt 3' is (radius, thickness)=$(x_0, 2z_0)$ before pressing and the polymer melt 3' is pressed at a constant rate v, the elongation strain rate $\epsilon(x)$ is defined as:

$$\epsilon(x)=(dx/dt)/x \qquad \text{Eq. (1)}.$$

It is assumed here that the polymer melt 3 is (radius, thickness)=$(x, 2z)$ at the time t.
From Eq. (1), $$v=dz/dt \qquad \text{Eq. (2)},$$

and volume conservation:

$$\pi x^2 z = \pi x_0^2 z_0 \qquad \text{Eq. (3)},$$

$\epsilon(x)$ can be put as:

$$\epsilon(x)=\alpha x^e \qquad \text{Eq. (4)}$$

where $\alpha=v/(2z_0 x_0^2)$.

Therefore, the elongation strain rate $\epsilon(x)$ for the disk-shaped polymer melt of the radius x can be calculated by Eq. (4).

Thus, by using the crystallization apparatus to find, from the result of study of the crystal size D, the critical point (x*) at which the polymer melt becomes the oriented crystal, and entering the value of the critical point (x*) in Eq. (4), the elongation strain rate $\epsilon(x^*)$ at the critical point, that is, the critical elongation strain rate $\epsilon^*$, can be determined.

Further, from Eq. (1), Eq. (2), and Eq. (3) above, $\epsilon(z)$ is defined as:

$$\epsilon(z)=(v/2)z^{-1} \qquad \text{Eq. (5)}.$$

Therefore, the elongation strain rate $\epsilon(z)$ for the disk-shaped polymer melt of the thickness $2z$ can be calculated by Eq. (5).

Thus, by using the crystallization apparatus to find, from the result of study of the crystal size D, the critical point $(z^*)$ at which the polymer melt becomes the oriented crystal, and entering the value of the critical point $(z^*)$ in Eq. (5), the elongation strain rate $\epsilon(z^*)$ at the critical point, that is, the critical elongation strain rate $\epsilon^*$, can be determined.

Figure 2:
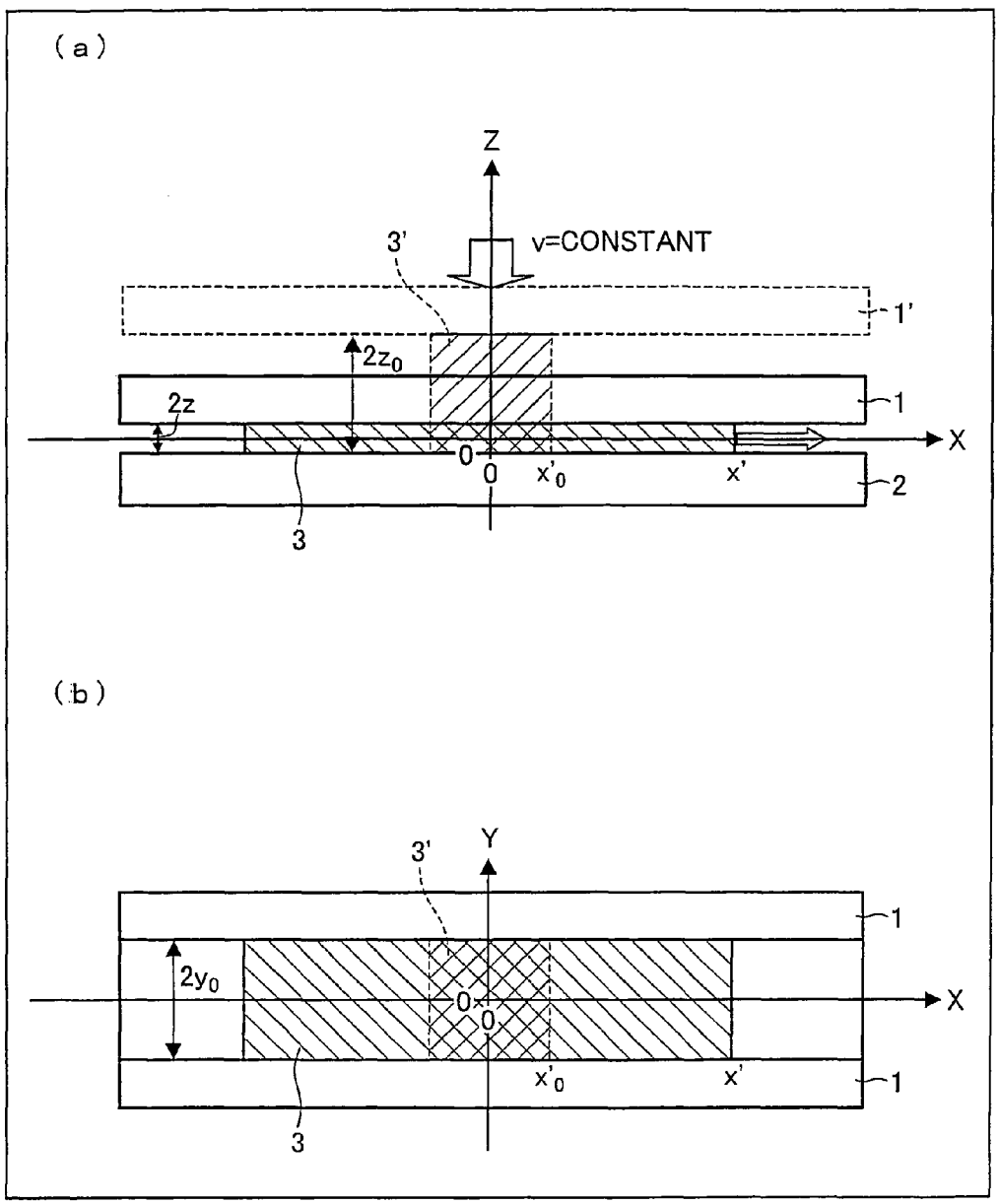
FIG. 2 shows (a) a side view of the Compression-type crystallization apparatus and (b) a top view of the Compression-type crystallization apparatus.

It should be noted that the present invention is not limited to the Compression-type crystallization apparatus described above, in which the polymer sample in the disk shape is placed on the flat lower transparent plate 2 and then tested. The critical elongation strain rate can be determined similarly with a polymer sample in a rectangular shape. One example of the Compression-type crystallization apparatus for use in determining the critical elongation strain rate with the rectangular-shaped polymer sample is illustrated in FIG. 2. (a) of FIG. 2 is a side view of the crystallization apparatus. (b) of FIG. 2 is an upper view of the crystallization apparatus. In FIG. 2, the same members are labeled in the same manner as the Compression-type crystallization apparatus shown in FIG. 1. Their explanation is omitted here. The crystallization apparatus illustrated in FIG. 2 is configured such that the lower transparent plate 2 has a recessed section thereon. The recessed section has a rectangular shape with a constant width $(2y_0)$. Meanwhile, the upper transparent plate 1 has a protrusion section thereon, which engages with the recessed section. The polymer melt may be placed in the recessed section and pressed by the protrusion section.

It is put that the thickness direction is a direction from the lower transparent plate 2 to the upper transparent plate 1 (the z-axis direction in FIG. 2), and a distance between the transparent plates between which the rectangular-shaped polymer melt is sandwiched is the thickness of the rectangular-shaped polymer melt. Furthermore, a direction in which the polymer melt is elongated when it is pressed by the upper and lower transparent plates is put as a longitudinal direction (x-axis direction in FIG. 2). A direction perpendicular to the longitudinal direction and the thickness direction is put as a width direction (y-axis direction in FIG. 2). Moreover, a distance between a mid point and an end of a longitudinal dimension of the rectangular-shaped polymer melt is put as a center distance.

Where the polymer melt 3' before pressing is (radius, thickness is $(x\alpha_0, \Delta z_0)$, the polymer melt 3 after pressing is (center distance, thickness)=$(x'_0, \Delta z_0)$, the elongation strain rate $\epsilon(x')$ for the center distance $x'$ attained when the polymer melt 3' is pressed at a constant rate v is defined as follows:

$$\epsilon(x')=(dx'/dt)/x' \quad \text{Eq. (1')}$$

where t is time.
From Eq. (1), $$v=dz/dt \quad \text{Eq. (2)}$$

and volume conservation:

$$x'yz=x'_0y_0z_0 \quad \text{Eq. (3')},$$

and $y=y_0$, $\epsilon(x')$ can be put as:

$$\epsilon(x')=\alpha x^2 \quad \text{Eq. (4')}$$

where $\alpha=v/(2x'^2_0 z_0)$.

Therefore, the elongation strain rate $\epsilon(x')$ for the rectangular-shaped polymer melt of the center distance $x'$ can be calculated from Eq. (4').

Thus, by finding the critical point center distance $(x'^*)$ at which the polymer melt becomes the oriented crystal as described above, and entering the value of the critical point $(x'^*)$ in Eq. (4), the elongation strain rate $\epsilon(x^*)$ at the critical point, that is, the critical elongation strain rate $\epsilon^*$, can be determined.

As explained above, the use of the board-shaped polymer melt makes it possible to extend the polymer melt sample one-dimensionally. Thus, how the polymer is crystallized at various strain rates can be observed by using Eq. (4'), whereby the critical elongation strain rate $\epsilon^*$ can be easily determined.

(2-2. Step of Preparing the Oriented Melt)

Next, a "step of preparing the bulk oriented melt" is described, which can be included in the method for producing oriented polymer crystalline materials. The "step of preparing the oriented melt" is a step of putting the polymer melt in an oriented melt state by elongating the polymer melt at a strain rate equal to or greater than the critical elongation strain rate $\epsilon^*$, which is determined in the step of determining the critical elongation strain rate.

This step is not limited to particular elongating method, elongating means, etc., provided that the polymer melt is elongated at strain rate equal to or greater than the critical elongation strain rate $\epsilon^*$. Further, the polymer melt may be the polymer melt supercooled below the equilibrium melting point, or may be the polymer melt that is above the equilibrium melting point. The term "equilibrium melting point" here means a thermodynamic melting point.

Figure 3:
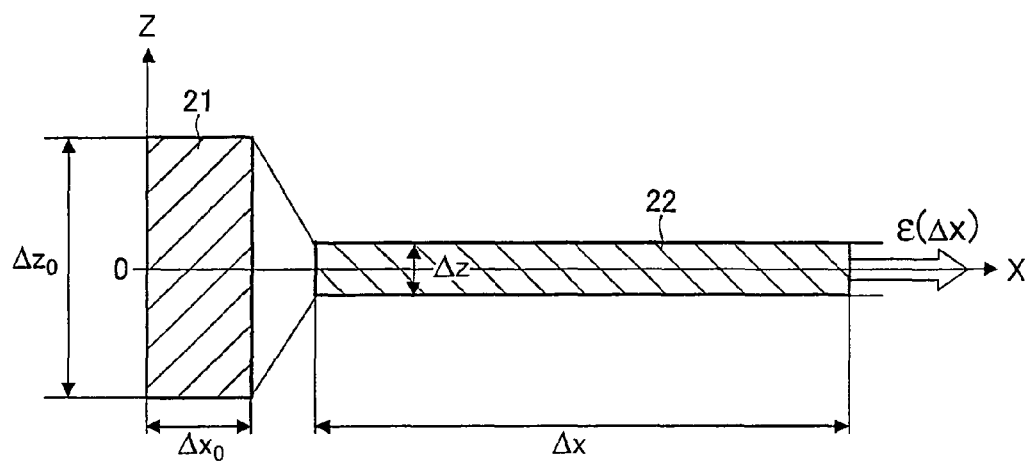
FIG. 3 is a sectional side view of a die (one example) for use in a method for producing oriented polymer crystalline materials according to the present invention, viewed from a y-axis direction.
Figure 4:
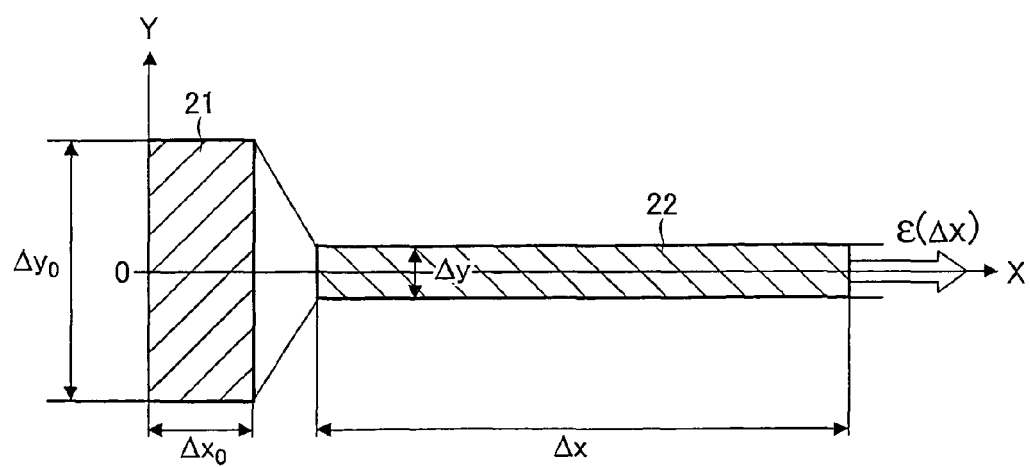
FIG. 4 is a sectional side view of the die (one example) for use in the method for producing oriented polymer crystalline materials according to the present invention, viewed from a z-axis direction.

One example of the step of preparing the oriented melt is explained referring to FIGS. 3 and 4. It should be noted that the present invention is not limited to this. FIGS. 3 and 4 are sectional side views of a sample in a die for use in sheet formation, film formation, injection molding, blow molding, etc. of the polymer melt. The polymer melt can be turned into the oriented melt by elongating the molecular chain in the polymer melt at a strain rate equal to or greater than critical elongation strain rate $\epsilon^*$ when the polymer melt is discharged or extruded via such a die, or when the polymer melt is treated with a roller or a mold thereafter.

Assume that the die illustrated in FIGS. 3 and 4 is used and the board-shaped (rectangular column-shaped) polymer melt 21 with "length $\Delta x_0$, width $\Delta y_0$, and thickness $\Delta z_0$" in the die is discharged or extruded from the die, or deformed by using the roller or mold, is deformed immediately before crystallization to the board-shaped (rectangular column-shaped) polymer melt 22 with "length $\Delta x$, width $\Delta y$, and thickness $\Delta z$" by compression or elongation carried out for time $\Delta t$. In this case, the elongation strain rate of the polymer melt is defined as:

$$\epsilon(\beta)=(\beta-1)\div\Delta t \quad \text{Eq. (6)},$$

where $\beta$ is a compression ratio, and $\beta=(\Delta y_0 \Delta z_0)(\Delta y \Delta z)$.

The "length $\Delta x$", which is a length along a mechanical direction (MD), is a distance between a bottom surface and an upper surface of the rectangular column-shaped polymer melt where the bottom and upper surfaces are surfaces face each other along a direction in which the polymer melt is extruded. Moreover, the "width" is a length of one edge of the bottom surface or upper surface in a square shape, and the "thickness" is a length of one edge perpendicular to the edge of the "width".

Thus, the oriented melt can be prepared by performing "compression deformation" of the polymer melt with appropriately selected "width $\Delta y_0$, thickness $\Delta z_0$" of the polymer melt in the die, appropriately selected "width $\Delta y$, thickness $\Delta z$" of the polymer melt after the discharge, extrusion, or deformation using the roller or molding, and appropriately selected $\Delta t$ (time required for compression deformation), in order that the elongation strain rate c as calculated by Eq. (6) is not less than the critical elongation strain rate.

(2-3: Crystallizing Step)

The following describes a "crystallizing step" that can be included in the method for producing bulk oriented polymer crystalline materials according to the present invention. The "crystallizing step" is a step of crystallizing the polymer melt while keeping the polymer melt in the oriented melt state. In cases where the polymer melt is turned into the oriented melt above the melting point through the oriented melt preparing step, the crystallizing step is a step of crystallizing the polymer melt by rapidly cooling it to a predetermined supercooling degree. In cases where the polymer melt is turned into the oriented melt already supercooled through the oriented melt preparing step, the polymer melt may be crystallized with the polymer melt left at a temperature at which the oriented melt state can be maintained. The crystallizing step causes molecular chains contained in the supercooled oriented polymer melt to meet each other in parallel, thereby causing nucleation and crystal growth at a remarkably accelerated pace. In this way, the oriented polymer crystalline materials are formed in such a short period of time as an order of milliseconds.

If the polymer melt is left in the oriented melt state, the polymer melt increase in entropy according to the thermodynamic law. As a result, the polymer melt is returned to the isotropic melt. Thus, in order to crystallize the polymer melt with the oriented melt state maintained, it is preferable to cool the polymer melt as rapidly as possible. Further, the temperature at which the polymer melt becomes supercooled is not particularly limited as long as it is a temperature lower than the melting point of the polymer. Assuming that the "supercooling degree $\Delta T$" is defined as the difference between the equilibrium melting point and the crystallization temperature, especially, an optimal supercooling degree significantly differs depending on the type and characterization of the polymer. Thus, the optimal supercooling degree may be adopted as appropriate. For example, $\Delta T$ is preferably in a range of 20 to 60° C. in the case of polypropylene. A supercooling degree less than the preferable range would lead to a significantly slow crystallization rate, thereby resulting in a low yield of the oriented polymer crystalline materials. A supercooling degree more than the preferable range would lead to slow diffusion of the molecular chains, thereby resulting in a low crystallization rate.

Figure 5:
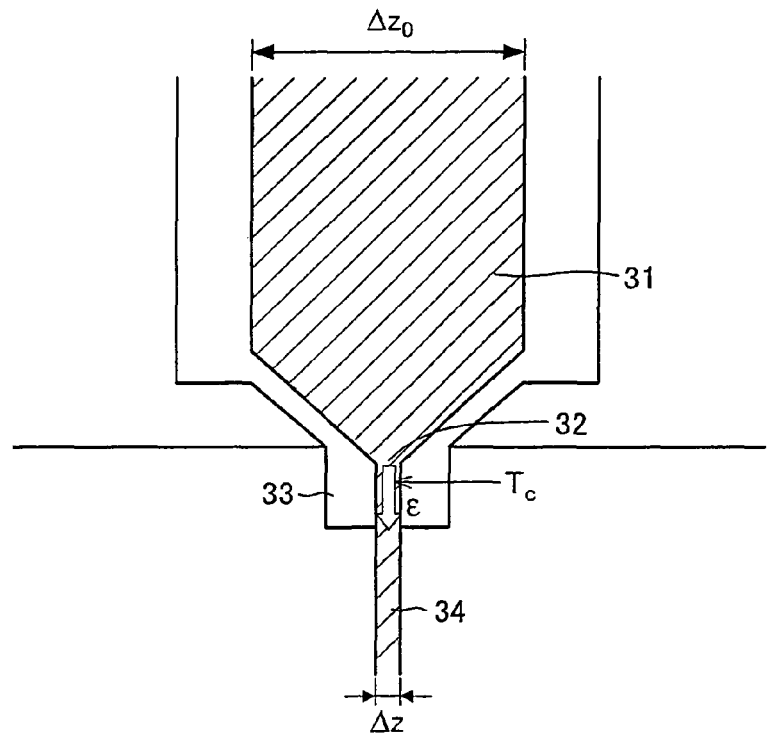
FIG. 5 is a schematic view of an apparatus (one example) for use in a method for producing oriented polymer crystalline materials according to the present invention.

FIG. 5 schematically illustrates an apparatus (one example) for use in the method for producing oriented polymer crystalline materials according to the present invention. This step is more specifically explained referring to this schematic view. For example, the oriented polymer melt discharged or extruded from an orifice 32 of a die is brought into contact with a rapid cooling crystallization section 33 having a prescribed cooling temperature. With this, the oriented polymer crystalline materials 34 are obtained in the downstream of the rapid cooling crystallization section 33. Moreover, the oriented polymer melt 31 extruded via the orifice 32 may be cooled by passing the extruded oriented polymer melt 31 though a liquid (such as water) of the prescribed temperature. Moreover, the oriented polymer melt 31 extruded via the orifice 32 may be cooled by exposing the extruded oriented polymer melt 31 to an environment of the prescribed cooling temperature. Moreover, the oriented polymer melt 31 extruded via the orifice 32 may be cooled by bringing the extruded oriented polymer melt 31 into contact with a roller cooled to the prescribed cooling temperature.

This step may be a step of forming the oriented polymer melt by rapidly stretching through the orifice 32 the supercooled polymer melt 31 cooled near the prescribed supercooling degree (i.e., the crystallization temperature) and discharging or extruding the oriented polymer melt through the orifice 32 of the die. According to the aforesaid principle, under such conditions that the elongation strain rate exceeds the critical elongation strain rate near the orifice 32, the oriented polymer melt discharged or extruded through the orifice 32 becomes oriented polymer crystalline materials 34. The rapid cooling crystallization section 33 is installed to retain a temperature at which the discharged or extruded oriented polymer melt can be crystallized while in the oriented melt state. The rapid cooling crystallization section 33 is not particularly limited as long as it is configured such that the extruded or injected oriented polymer melt can be cooled at a prescribed temperature, and may be constituted by a liquid or gas cooled to the prescribed cooling temperature. Moreover, the oriented polymer melt 31 discharged or extruded through the orifice 32 may be exposed to an environment of the prescribed cooling temperature. Moreover, the oriented polymer crystalline materials may be formed by bringing the oriented polymer melt 31 discharged or extruded through the orifice 32 into contact with a roller cooled to the prescribed cooling temperature.

Furthermore, in case where the oriented polymer melt 31 is injected into a mold via the die for molding (e.g., extrusion molding, injection molding, blow molding), the mold may be cooled to the prescribed cooling temperature. This gives a molded article (e.g., extrusion molded article, injection molded article, blow molded article) of the polymer crystalline materials. The shape of an end of the die is not particularly limited, and can be changed appropriately for any purpose. For example, when the end of the die is provided with a porous plate having a prescribed hole diameter, it is possible to obtain fibers of the oriented polymer crystalline materials with a prescribed outer diameter.

Figure 6:
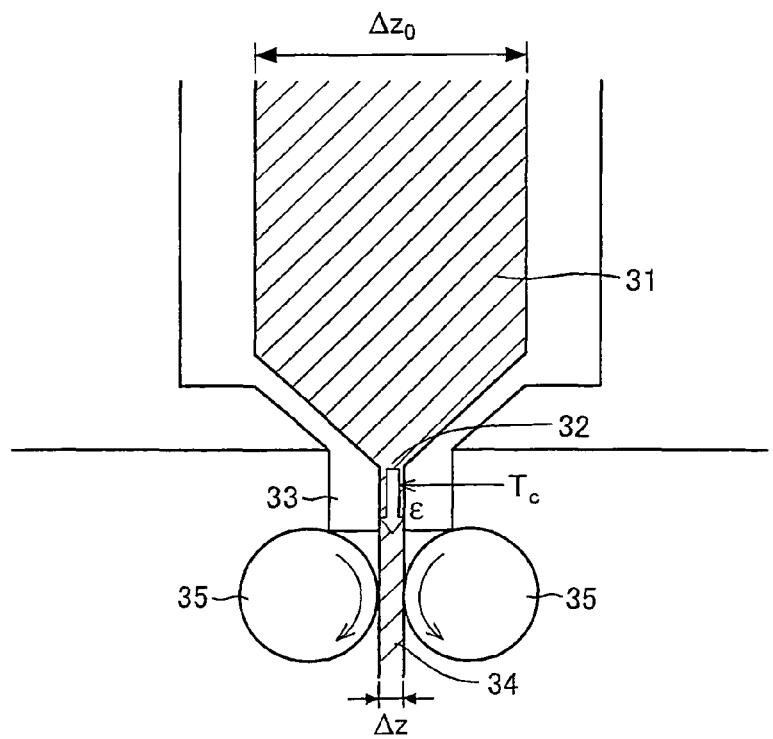
FIG. 6 is a schematic view of an apparatus (another example) for use in a method for producing oriented polymer crystalline materials according to the present invention.

FIG. 6 shows another example of the apparatus for use in the method for producing oriented polymer crystalline materials according to the present invention. The apparatus of FIG. 6 is obtained by providing the apparatus of FIG. 5 with rollers 35 for pulling out the oriented polymer melt 31.

FIG. 6 shows another example of the apparatus for use in the method for producing oriented polymer crystalline materials according to the present invention. The apparatus of FIG. 6 is obtained by providing the apparatus of FIG. 5 with rollers 35 for cooling the oriented polymer melt 31 to the prescribed cooling temperature.

The oriented polymer crystalline materials thus obtained are bulk nanometer-order oriented polymer crystalline materials. The bulk nanometer-order oriented polymer crystalline materials are almost entirely made of close-packed oriented crystalline substance, and are distinguishable from the conventional oriented crystal material "incomplete oriented crystal material including sparsely-existing shish and kebab that is a laminated lamellar structure surrounding shish", or a crystal that is very partially oriented like the "spiralite" discovered by the inventors of the present invention.

Possible applications of the oriented polymer crystalline materials of the present invention encompass the following, for example. The oriented polymer crystalline materials of PP can be applied to most (90% or more) of interior parts of automobiles. Moreover, with high rigidity and high toughness thereof, the oriented polymer crystalline materials of PP are applicable to interior and exterior parts of vehicles such as automobiles, air planes, rockets, trains, ships, motorbikes, and bicycles, and parts or machine parts of machine tools, in replacement of metals. High rigidity and light weight of the oriented polymer crystalline materials of PP make it possible to use it as diaphragm for speaker or microphone. Moreover, because it has a high transparency, the oriented polymer crystalline materials of PP are applicable to CDs and DVDs in replacement of PC. Moreover, the high transparency thereof allows the oriented polymer crystalline materials of PP to be used as masks for liquid crystal/plasma displays. Moreover, with the high transparency, the oriented polymer crystalline materials of PP can be used for medical tools or apparatuses such as disposable syringes, tools for intravenous drips, drug containers, etc. Moreover, the highly transparent oriented polymer crystalline materials of PP are applicable to various bottles, glasses, small aquarium tanks for home use, large aquarium tanks for business use, in replacement of glass. Moreover, the highly transparent oriented polymer crystalline materials of PP are applicable to contact lenses, glass lenses, and various optical lenses. Moreover, the highly transparent oriented polymer crystalline materials of PP are applicable to glass for buildings and houses. Further, with the high rigidity, high toughness, and light weight, the oriented polymer crystalline materials of PP can be applied to various sports goods such as ski shoes, ski boards, boards, rackets, various nets, tents, knapsacks, and the like. Moreover, the high rigidity, high toughness, and light weight thereof makes it possible to use the oriented polymer crystalline materials of PP in handcraft tools and decorating tools such as needles, scissors, sewing machines, etc. Furthermore, the oriented polymer crystalline materials of PP are applicable to retailing products such as show windows and store display products. Moreover, the oriented polymer crystalline materials of PP can be used in tools or facilities in parks, amusement parks, theme parks, such as joggling boards, see-saws, roller coasters, etc. Apart from these, the oriented polymer crystalline materials of PP are applicable to: structuring materials constituting parts of electric, electronic, information apparatuses or precision instruments such as clocks or box materials thereof; stationeries such as files, folders, pen cases, writing tools, scissors, etc.: cooking tools such as knifes, bowls, etc.; wrapping materials for foods, sweets, and tobaccos; food containers, tableware, disposable chopsticks, toothpicks; furniture such as home-use furniture, office furniture, etc.; building materials, interior materials, and exterior materials for buildings and houses; materials for roads or bridges; materials for toys; super tensile spike fibers and strings; fishery tools, fishing nets, and fishing tools; agricultural tools, agricultural goods; shopping bags, garbage bags; various pipes; gardening supplies; and transport containers, pallets, boxes; and the like.

Meanwhile, the oriented polymer crystalline materials of PE are applicable to super tensile spike fibers and strings.

Meanwhile, the oriented polymer crystalline materials of a fluorine polymer such as polyvinylidene fluoride have a high ferroelectricity and piezoelectricity, which enables them to be applied to highly accurate supersonic elements, fast switching elements, high performance speaker, highly sensitive microphones, and the like.

Meanwhile, the oriented polymer crystalline materials of PET are applicable to industrial materials required to have high heat tolerance against approximately 200° C.

In the following, the embodiment of the present invention is described more specifically with reference to Examples. It should be noted that the present invention is not limited these Examples, and details thereof can take various aspects. The present invention is not limited to the description of the embodiment above, but may be altered by within the scope of the claims. An embodiment based on a proper combination of technical means disclosed in different embodiments is encompassed in the technical scope of the present invention.

Further, all the academic literatures and patent literatures cited in this specification are of assistance as references in this specification.

Example 1

Methods

Isotactic polypropylene (referred to as "iPP") used in elongation crystallization was prepared by the inventors of the present invention and had $M_w=30\times10^4$ and $M_w/M_n=30$ (equilibrium melting point $T_m^0=187.3°$ C.), where "$M_w$" is the weight average molecular weight and "$M_n$" is the number average molecular weight. It was assumed that $T_m^0$ for $M_w$ was identical with $T_m^0$ of $M_w$ determined in "K. Yamada, M. Hikosaka et al., *J. Mac. Sci. Part B-Physics*, B42 (3 & 4), 733 (2003)".

The iPP thus prepared was shaped into a rod shape (=columnar shape) and placed on the lower transparent plate 2 of the Compression-type crystallization apparatus 10 (hereinafter referred to as "crystallization apparatus") of FIG. 1. Then, the upper transparent plate 1 was placed on top of the rod-shaped iPP. The iPP under this condition was melted at a temperature of 200.0° C. to give the iPP melt. The iPP melt was then cooled at a cooling rate of 30° C./min to a crystallization temperature $T_c=150°$ C. (supercooling degree $\Delta T=37.3$ K). Then, the sample (iPP melt) was pressed at a rate v=0 to 70 mm/sec. It should be noted that the rate v means a given constant rate selected from the range of 0 to 70 mm/sec. After that, elongation crystallization ("isothermal elongation crystallization") was performed at the crystallization temperature. The "isothermal elongation crystallization" process was directly observed by a polarizing microscopic system from the x-axis direction of FIG. 1, whereby the form, the orientation of polymer chains, a change in crystal size or the like and the waiting time ($\tau$) required for the formation of a crystal were recorded and measured. The polarizing microscope was a. BX51N-33P manufactured by Olympus Optical Co., Ltd. The CCD was a CCD VIDEO Camera DXC-9000 manufactured by Sony Corporation. For recording, a personal computer was used. Further, in order to quantitatively measure changes in retardation, a sensitive-tint plate was inserted between a polarizer and an analyzer (polarizing plate) of the polarizing microscope (see H. Awaya, *Kobunshi Sozai no Henko Kenbikyo Nyumon* (Introduction of Polarizing Microscope for Polymer Materials, Agne Gijutsu Center Co., Ltd. 2001, p. 75-103). For analysis of recorded images, image analysis software (Image-Pro PLUS; manufactured by Media Cybernetics) was used. The polarizing microscopic observation of the sample taken out after the crystallization was performed from three directions, namely the x-axis direction of FIG. 1, the z-axis direction of FIG. 1, and the direction (y-axis direction) perpendicular to the x- and z-axis directions.

The measurement of the crystal size D of the sample taken out after the crystallization was performed by the small-angle X-ray scattering method (hereinafter referred to as "SAXS method") and the optical microscopic method. The optical microscopic method was performed as described in "H. Awaya, *Kobunshi Sozai no Henko Kenbikyo Nyumon* (Introduction of Polarizing Microscope for Polymer Materials, Agne Gijutsu Center Co., Ltd. p. 1-255, 2001" with use of the polarizing microscopic system. More specifically, the size D of the crystal was measured by using a scale calibrated by a micrometer caliper. The measurement was performed at room temperature (22° C.).

The small-angle X-ray scattering method (hereinafter referred to as "SAXS method") was performed as described in "M. Kakudo and N. Kasai, *Kobunshi Ekkusu-sen Kaisetsu* (Polymer X-ray Diffraction), Maruzen Co., Ltd., 1968" or "T. Masuko, *Kobunshi Ekkusu-sen Kaisetsu* (Polymer X-ray Diffraction), 3.3 ed. Yamagata University Student Cooperative, 1995". More specifically, a small-angle X-ray scattering pattern is obtained by setting a sample on a small-angle X-ray scattering apparatus having a wavelength λ of 0.15 nm and a camera length of 1.5 m and irradiating the sample with X-rays. A curve of the small-angle X-ray scattering intensity ($I_x$) against the scattering vector (q) is measured by integrating the scattering intensity at a q along a circle with the origin at the beam center and offsetting the scattering intensity of a background such as air. The small-angle X-ray scattering measurement was performed in SPring-8, Beam Line BL40B2 of Japan Synchrotron Radiation Research Institute (JASRI) at room temperature (22° C.) with use of an Imaging Plate as a detector.

Further, the measurement of the crystal orientation of the sample taken out after the crystallization was performed by the wide-angle X-ray scattering method (hereinafter referred to as "WAXS method"). The wide-angle X-ray scattering method (hereinafter referred to as "WAXS method") was performed as described in "M. Kakudo and N. Kasai, *Kobunshi Ekkusu-sen Kaisetsu* (Polymer X-ray Diffraction), Maruzen Co., Ltd., 1968" or "T. Masuko, *Kobunshi Ekkusu-sen Kaisetsu* (Polymer X-ray Diffraction), 3.3 ed. Yamagata University Student Cooperative, 1995". More specifically, a wide-angle X-ray scattering pattern is obtained by setting a sample on a wide-angle X-ray scattering apparatus having a wavelength λ of 0.072 nm and a camera length of 250 mm and irradiating the sample with X-rays. A curve of the wide-angle X-ray scattering intensity ($I_x$) against the scattering vector (q) is measured by integrating the circumference of a scattering pattern with the beam center as the origin and offsetting the scattering intensity of a background such as air. The wide-angle X-ray scattering measurement was performed in SPring-8, Beam Line BL40B2 of Japan Synchrotron Radiation Research Institute (JASRI) at room temperature (22° C.) with use of an Imaging Plate as a detector.

In the description of Examples, the terms "x-axis direction", "y-axis direction", and "z-axis direction" mean the "x-axis direction of FIG. 1", the "y-axis direction of FIG. 1", and the "z-axis direction of FIG. 1", respectively, unless otherwise specified.

[Results]

Figure 7:
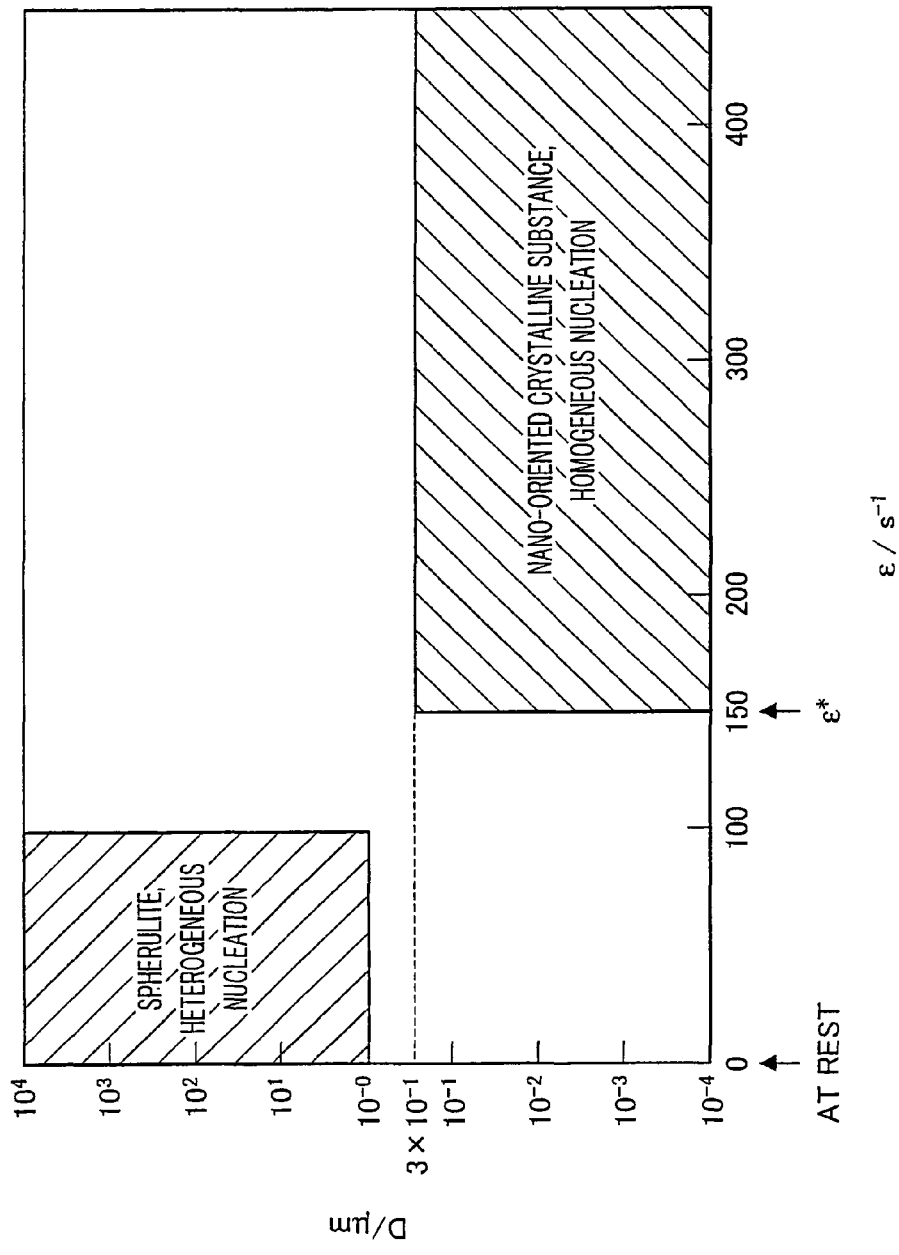
FIG. 7 shows a relationship between the elongation strain rate c and the crystal size D.
Figure 8:
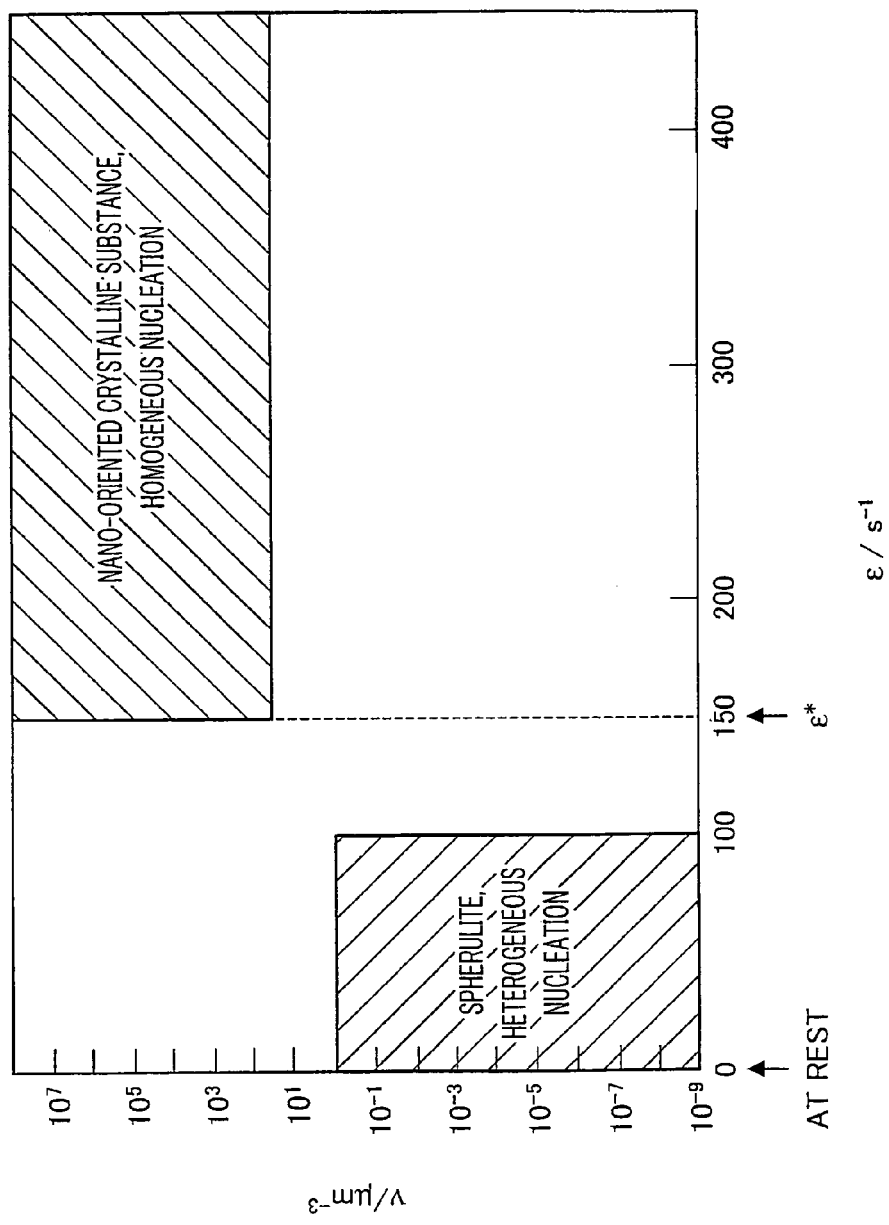
FIG. 8 shows a relationship between the elongation strain rate c and the number density v.

FIG. 7 shows a relationship between the elongation strain rate ε and the crystal size D as studied by the optical microscopic method and the SAXS method. As a result of judging that homogenous nucleation occurs and oriented polymer crystalline materials are formed in cases where the crystal size D is 300 nm or less, it was found that the critical elongation strain rate ε* is 150 $s^{-1}$. FIG. 8 shows a relationship between the elongation strain rate ε and the number density ν as studied by the optical microscopic method and the SAXS method.

Figure 9:
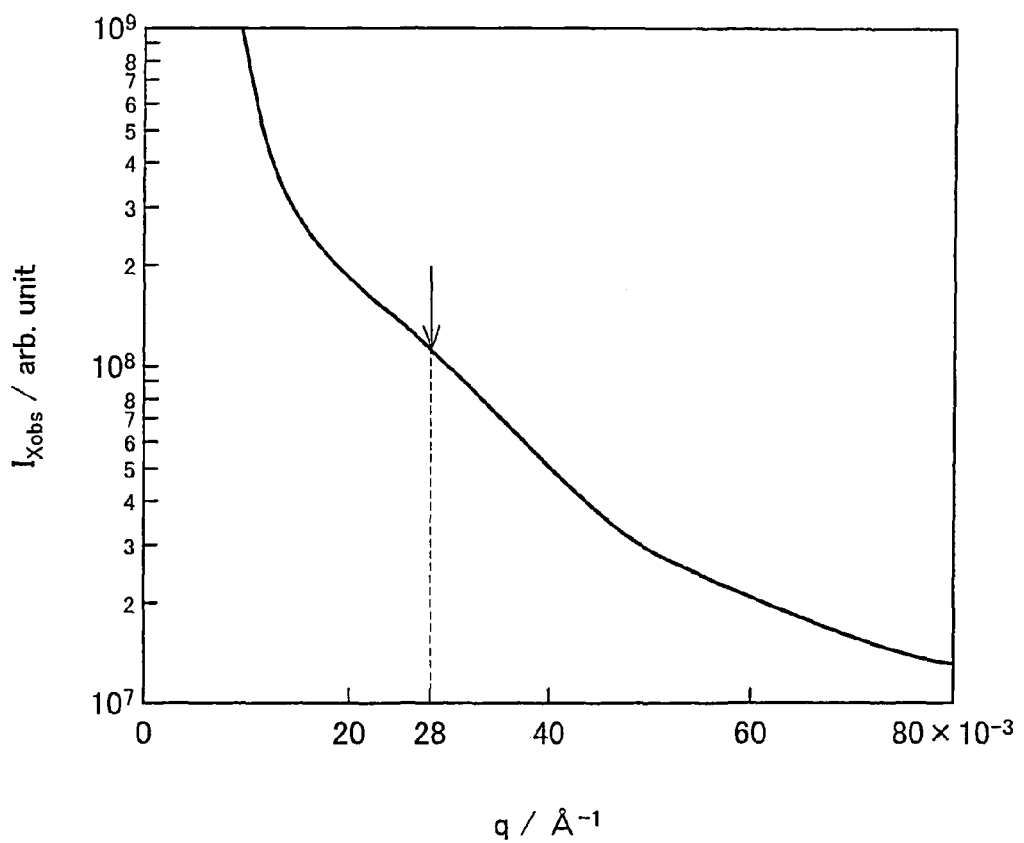
FIG. 9 shows a result of an SAXS analysis performed on polymer crystalline materials crystallized by elongation at an elongation strain rate c of $400 \text{ s}^{-1}$.

FIG. 9 shows a result of an SAXS determination of the crystal size D of a sample crystallized by elongation at 400 $s^{-1}$ which is not less than the critical elongation strain rate. FIG. 9 shows a peak (indicated by the downward arrow "↓" in FIG. 9) at a small angle q=0.028 $Å^{-1}$. Therefore, based on the Bragg equation D=2π÷q, it was found that the crystal size D equals 22 nm. In FIG. 9, $I_x(q)$ indicates the scattering intensity, and q indicates the scattering vector (same applies below).

The crystallinity $\chi_c$ of a sample crystallized at a crystallization temperature $T_c$ of 150° C. and an elongation strain rate ε of 400 $s^{-1}$, the crystallinity $\chi_c$ of a sample crystallized at a crystallization temperature $T_c$ of 150° C. and an elongation strain rate ε of 250 $s^{-1}$, and the crystallinity $\chi_c$ of a sample crystallized at a crystallization temperature $T_c$ of 150° C. at rest (elongation strain rate ε=0 $s^{-1}$) were measured by the density measurement method. More specifically, the crystallinity of each sample was determined by the density measurement method with water and ethyl alcohol with reference to L. E. Alexander, "*Kobunshi no Ekkusu-sen Kaisetsu (Jyo)*" (X-ray Diffraction of Polymers (I)), Kagakudojin, 1973, p. 171). In the result, the sample crystallized at an elongation strain rate ε of 400 $s^{-1}$, which is not less than the critical elongation strain rate, had a crystallinity $\chi_c$ of 0.80 (i.e., 80%). Meanwhile, the sample crystallized at rest (elongation strain rate ε=0 $s^{-1}$) had a crystallinity $\chi\chi_c$ of 0.55 (i.e., 55%). This shows that the crystallinity of a sample crystallized at the critical elongation strain rate or greater is extremely high.

Figure 10:
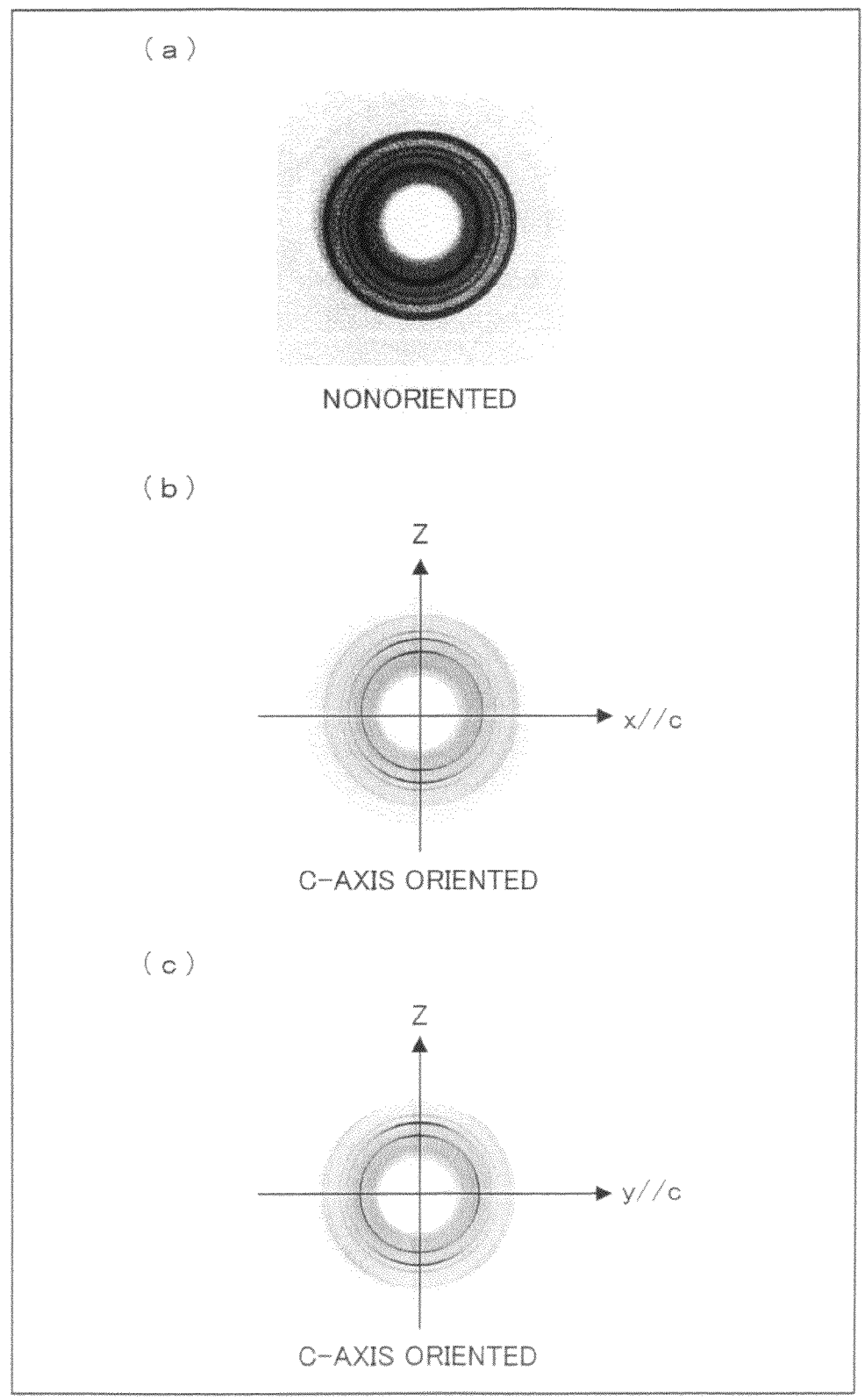
FIG. 10 shows WAXS patterns (a) to (c) of polymer crystalline materials crystallized by elongation at an elongation strain rate c of $400 \text{ s}^{-1}$, i.e., (a) a WAXS pattern view from the z-axis direction, (b) a WAXS pattern viewed from the y-axis direction, and (c) a WAXS pattern viewed from an x-axis direction.

FIG. 10 shows wide-angle X-ray scattering patterns (hereinafter referred to as "WAXS patterns") of a sample crystallized by elongation at an elongation strain rate ε of 400 $s^{-1}$. In FIG. 10, (a), (b), and (c) show a WAXS pattern viewed from the z-axis direction, a WAXS pattern viewed from the y-axis direction, and a WAXS pattern viewed from the x-axis direction, respectively. FIG. 10 shows that (a) is nonoriented and (b) and (c) are oriented along c-axis. This result shows that the elongation of the iPP melt at the critical elongation strain rate or greater results in the oriented melt whose molecules are oriented in a direction perpendicular to the direction (z-axis direction) in which the iPP melt was pressed.

Figure 11:
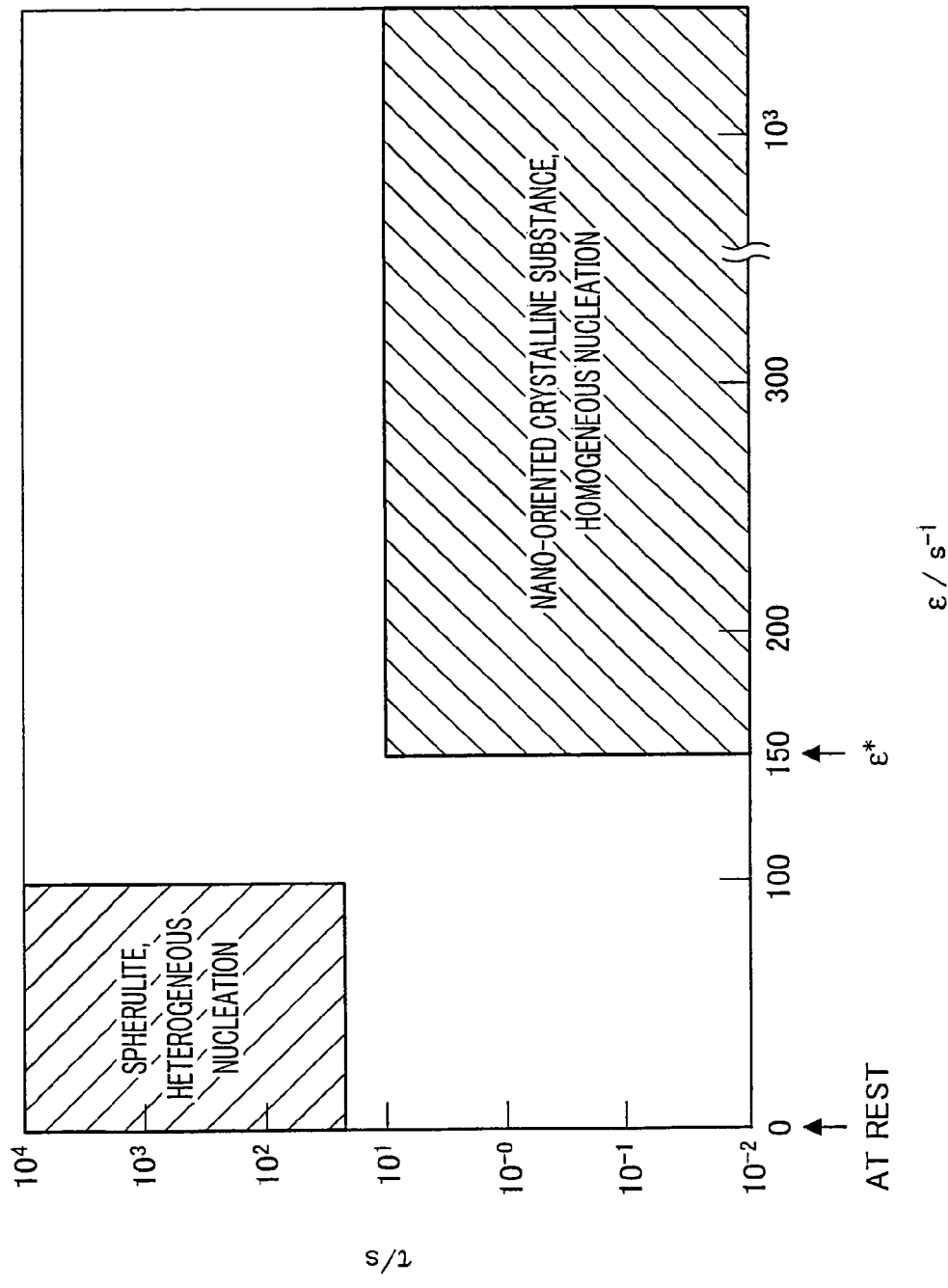
FIG. 11 shows a relationship between the elongation strain rate $\epsilon$ and the waiting time (t) required for the formation of a crystal.

FIG. 11 shows a relationship between the elongation strain rate ε and the waiting time (τ) required for the formation of a crystal directly observed with the polarizing microscope system. Elongation crystallization at the critical elongation strain rate ε* (150 $s^{-1}$) or greater resulted in a remarkable reduction in τ. This is considered to be because homogenous nucleation increased the frequency of nucleation and the increase caused a rise in crystallization rate. Such a rise in crystallization rate makes it possible to (a) shorten the amount of time required to process polymer crystalline materials by molding and (b) make molding temperature sufficiently higher than before. Therefore, it is expected that productivity is improved and energy is saved in a molding step in which a polymer is used.

[Measurement of Tensile Strength]

The tensile strength of a sample crystallized by elongation at 400 $s^{-1}$ was measured. More specifically, a sample (with the dimensions 2 mm (long)×1 mm (wide)×0.1 mm (thick)) of oriented polymer crystalline materials was set in a Shimadzu's precision universal tester (Autograph AG-1kNIS), and the tensile strength was measured by stretching the sample at a tensile rate of 0.3 mm/sec. The tensile strength was measured at room temperature (22° C.).

The result is shown in Table 1. By way of comparison, Table 1 shows data on the tensile strengths of PE, PP (unstretched) (see E. P. Moore, Polypropylene Handbook, Kogyo Chosakai Publishing, Inc., 1998, p. 295), PET (see I. Narisawa, *Purasutikkusu no Kikai-teki Seishitsu* (Mechanical Properties of Plastics), Sigma Shuppan, KK., 1994, p. 90), and metals (aluminum (Al), brass, stainless steel, and steel (SNCM7)). It should be noted that the data on the metals were cited from (Iida et al., *Busshitsu Teisuhyo* (Table of Physical Properties of Substances), Asakura Publishing Co., Ltd., 1969, p. 187-191).

TABLE 1

|  | Tensile strength (GPa) |
| --- | --- |
| Oriented polymer crystalline materials (PP): Example 1 | 0.1-0.15 |
| PE | 0.03-0.07 |
| PP (unstretched) | 0.04-0.06 |
| PET | 0.06 |
| Al | 0.1 |
| Brass | 0.4 |
| Stainless steel | 0.5 |
| Steel (SNCM7) | 1 |

According to the result shown in Table 1, the tensile strength of the oriented polymer crystalline materials (PP) is remarkably greater than that of the commercially available PP (unstretched) or PE. Further, the oriented polymer crystalline materials (PP) exhibited a tensile strength equal to or greater than that of PET or Al.

Therefore, it was confirmed that the application of the present invention to PP makes it possible to replace the engineering plastics or metals with PP, which is a general-purpose plastic.

Example 2

Methods

The iPP used in Example 2 had $M_w=33.5\times10^4$ and $M_w/M_n=30$ (equilibrium melting point $T_m^0=187.4°$ C.).

The iPP thus prepared was shaped into a rod shape (=columnar shape) and placed on the lower transparent plate 2 of the crystallization apparatus of FIG. 1. Then, the upper transparent plate 1 was placed on top of the rod-shaped iPP. The iPP under this condition was melted at a temperature of 192.0° C. for three minutes to give the iPP melt. The iPP melt was then cooled at a cooling rate of 30° C./min to a crystallization temperature $T_c=150°$ C. (supercooling degree $\Delta T=37.4$ K). Then, elongation crystallization ("isothermal elongation crystallization") was performed by pressing the sample (iPP melt) at a rate v=0 to 10 mm/s. The elongation strain rate $\epsilon$ was 0 to $3\times10^3$ s$^{-1}$. It should be noted that the rate v means a given constant rate selected from the range of 0 to 10 mm/s.

Optical microscopic observation of the isothermal elongation crystallization process and the crystallized sample and analysis thereof were performed as described in Example 1. In particular, for the purpose of polarizing microscopic observation at high time resolution, a polarizing microscopic observation was performed in Example 2 with use of an ultrahigh-speed and ultrasensitive video (MEMRECAMfx K5; manufactured by Nac Image Technology, Inc.) capable of observation at a high time resolution of 0.01 ms (100,000 frames per second).

The sample crystallized by elongation was analyzed by the SAXS and WAXS methods. The SAXS and WAXS methods were performed as described in Example 1.

The tensile testing method was performed by installing, in a Shimadzu's precision universal tester (Autograph AG-1kNIS), a "minute sample tensile testing unit (ESP-XMO1)" newly developed and sold jointly by Shimadzu Corporation and the inventors of the present invention, setting a test piece with the dimensions 2 mm (long)×0.5 mm (wide)× 10 μm (thick), and stretching the test piece at a tensile rate of 0.3 mm/sec. The tensile testing method was performed at room temperature (22° C.).

The transparency (haze, thickness of 10 μm) of the test piece was measured by the transmitted light intensity measurement method. The transmitted light intensity measurement method is performed by measuring the amount of light transmitted through the test piece. Used for the transmitted light intensity measurement method was an apparatus including an optical microscope (BX51N-33P; manufactured by Olympus Optical Co., Ltd.) a CCD camera (CCD VIDEO Camera DXC-9000; manufactured by Sony Corporation) capable of determining the amount of light, and image analysis software (Image-Pro PLUS; manufactured by Media Cybernetics). Incident light as measuring light from a halogen lamp serving as a white light source formed a circle having a diameter of 1 mm. The calibration of the value of haze in the transmitted light intensity measurement was performed by way of comparison with a film of Comparative Example 1 of the same thickness whose haze was measured in conformity to JIS K7136.

The allowable temperature limit of the sample was measured by a method for directly reading the size of a test piece with use of an optical microscope. A test piece with the dimensions 1 mm (long)×1 mm (wide)×15 μm (thick) was placed on a hot stage (L-600A; manufactured by Linkam), and the surface temperature of the hot stage was raised at 1 K/min. In so doing, the size of the test piece was observed by a CCD camera-equipped optical microscope (BH; manufactured by Olympus Optical Co., Ltd.), and the temperature at which the test piece contracted by 2% in a longitudinal direction or in a transverse direction was taken as the allowable temperature limit.

[Results]

Figure 17:
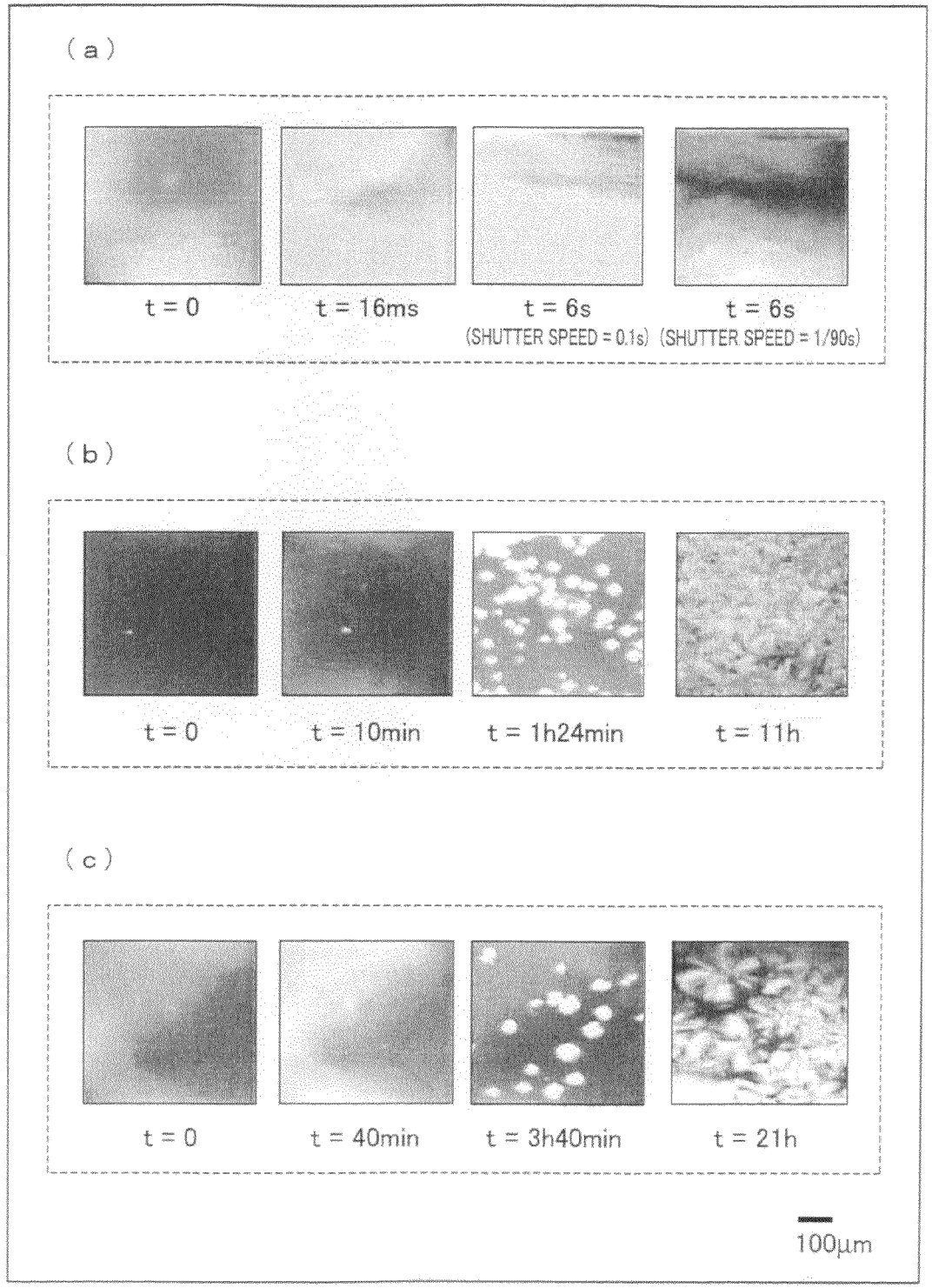
FIG. 17 shows results of polarizing microscopic observation of (a) behavior of a sample crystallized by isothermal elongation at an elongation strain rate of $10^3 \text{ s}^{-1}$, (b) behavior of a sample crystallized by isothermal elongation at an elongation strain rate of $3 \text{ s}^{-1}$, and (c) behavior of a sample crystallized at rest.
Figure 24:
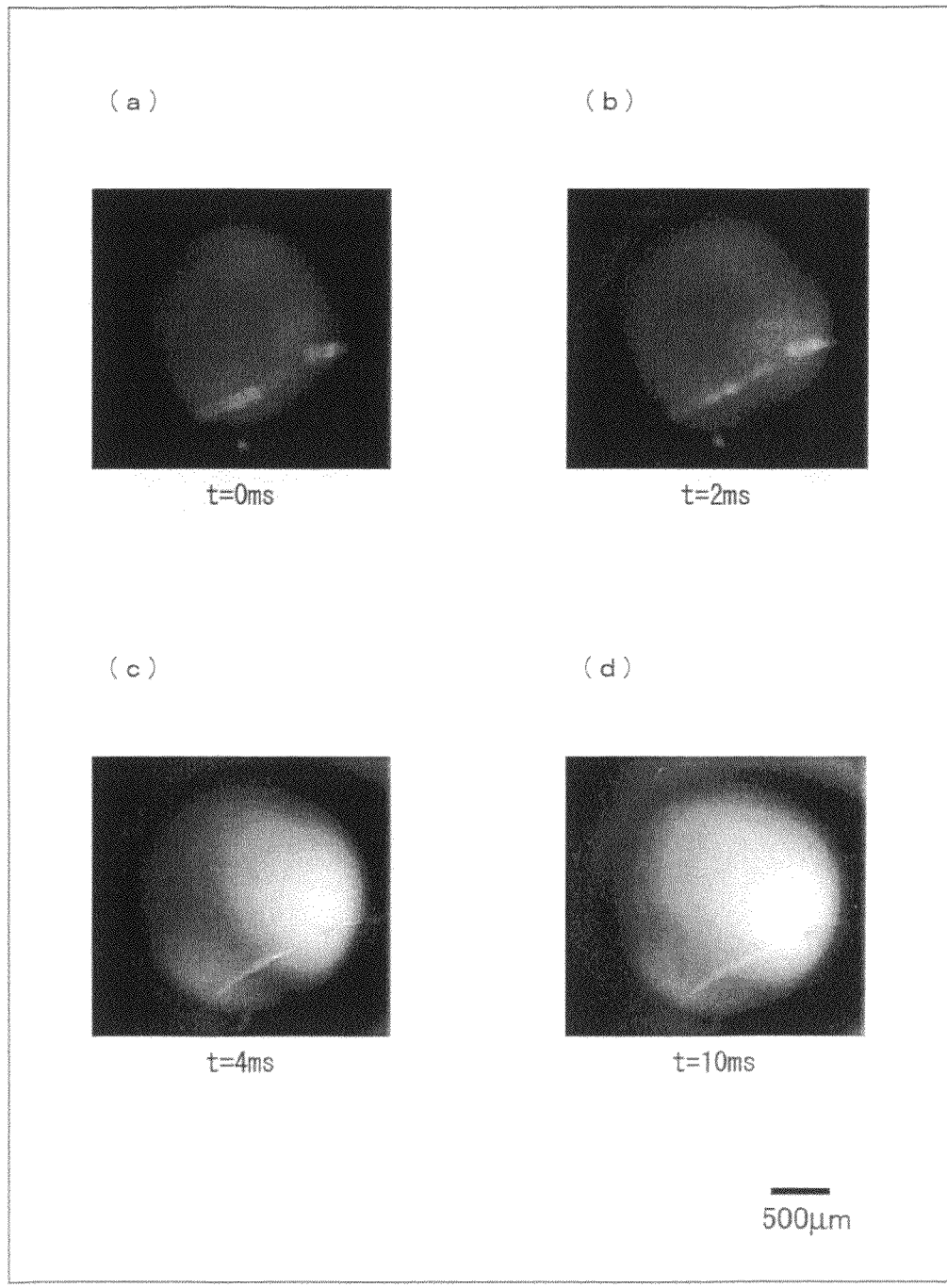
FIG. 24 shows results of polarizing microscopic observation by an ultrahigh-speed and ultrasensitive video camera of crystallization behavior of a sample crystallized by isothermal elongation at an elongation strain rate c of $10^3 \text{ s}^{-1}$, i.e., (a) a result obtained from the sample when the time elapsed since compression was 0 ms (t=0 ms), (b) a result obtained from the sample when the time elapsed since compression was 2 ms (t=2 ms), (c) a result obtained from the sample when the time elapsed since compression was 4 ms (t=4 ms), and (d) (a) a result obtained from the sample when the time elapsed since compression was 10 ms (t=10 ms).

FIG. 17 shows results of polarizing microscopic observation of (a) behavior of a sample crystallized by isothermal elongation at an elongation strain rate of $10^3$ s$^{-1}$, (b) behavior of a sample crystallized by isothermal elongation at an elongation strain rate of 3 s$^{-1}$, and (c) behavior of a sample crystallized at rest (elongation strain rate $\epsilon=0$ s$^{-1}$). FIG. 24 shows results of polarizing microscopic observation by an ultrahigh-speed and ultrasensitive video camera (MEMRE-CAMfx K5; manufactured by Nac Image Technology, Inc.) of crystallization behavior of a sample crystallized by isothermal elongation at an elongation strain rate c of $10^3$ s$^{-1}$. In FIGS. 17 and 24, t represents the time elapsed since compression.

(a) of FIG. 17 shows that in the case of isothermal elongation crystallization at an elongation strain rate of $10^3$ s$^{-1}$, which is not less than the critical elongation strain rate, the solidification of the iPP melt was finished at less than t=16 ms. The two photographs each indicated by "t=6 s" in (a) of FIG. 17 are images taken by shooting the same sample at different shutter speeds (0.1 s and 1/60 s), and as such, vary in shade from each other due to the difference in shutter speed. As a result of further detailed study, in the case of isothermal elongation crystallization at an elongation strain rate of $10^3$ s$^{-1}$, which is not less than the critical elongation strain rate, the solidification of the iPP melt was finished at t=2 ms or less and no further change was found thereafter (see FIG. 24). Further, from the fact that the retardation seen in high-powered microscopic observation of the sample that had been solidified and taken out exhibited a "centrosymmetric colored pattern", it was found that the polymer chains are oriented in the x-axis direction (radially). In the case of isothermal elongation crystallization at an elongation strain rate of $10^3$ s$^{-1}$, no crystal grains were observed microscopically. This is because the size of the microcrystals is beyond the resolution of the microscope. This shows that the size of the microcrystals contained in the sample crystallized by isothermal elongation at an elongation strain rate of $10^3$ s$^{-1}$ is on the order of nanometers (several-tenths of μm or less) (see (a) of FIG. 17 and FIG. 2424). The accurate size was determined in accordance with the result of an X-ray scattering experiment described later.

Meanwhile, in the case of isothermal elongation crystallization at 3 s$^{-1}$, which is less than the critical elongation strain rate, and in the case of crystallization at rest (elongation strain rate $\epsilon$=0 s$^{-1}$), a spherulite on the order of 10$^2$ µm is slowly formed, and it took several hours to finish the solidification of the iPP melt (see (a) and (c) of FIG. 17).

Figure 12:
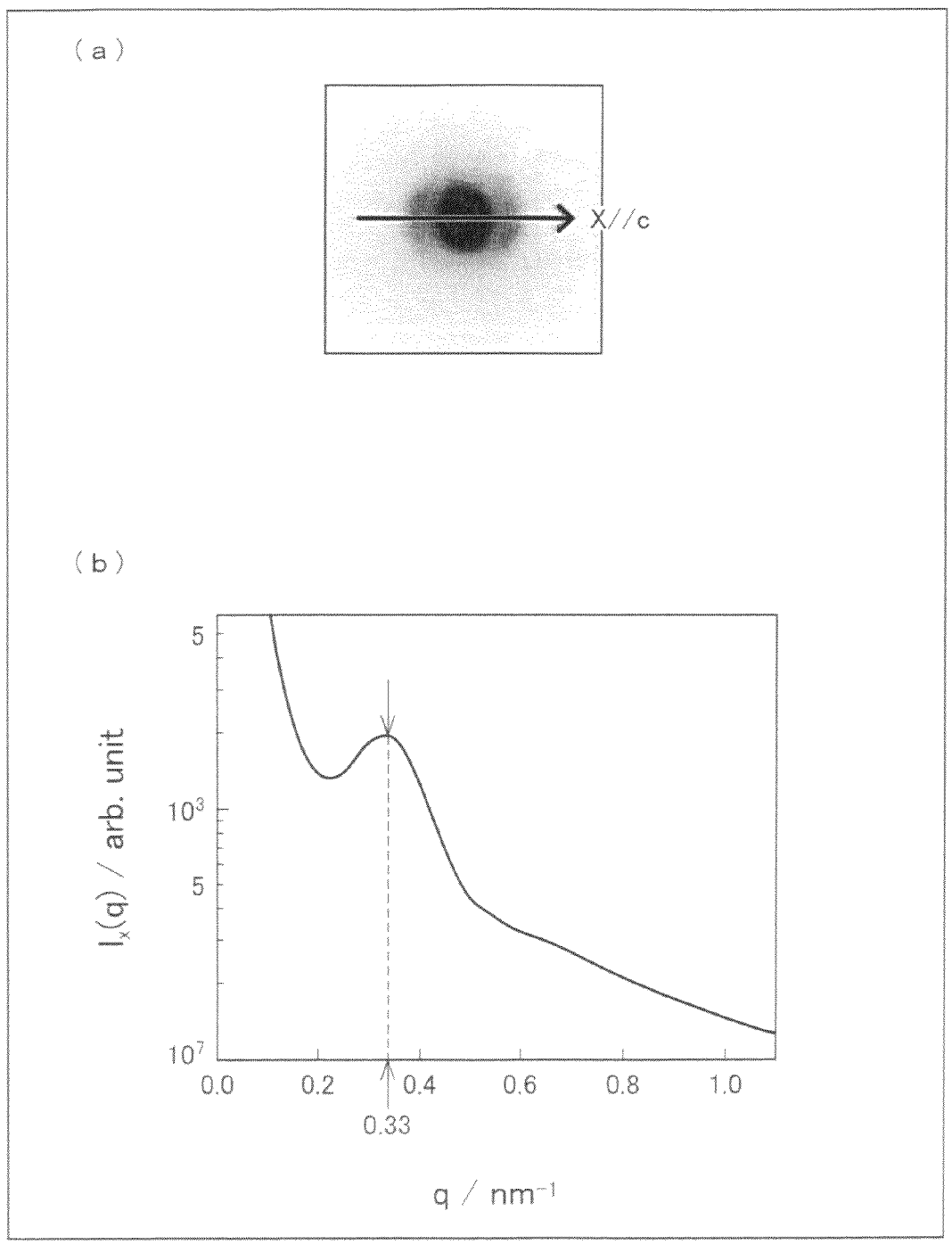
FIG. 12 shows results of an SAXS analysis performed on a sample crystallized by elongation at an elongation strain rate of $3\times10^3 \text{ s}^{-1}$, which is not less than the critical strain rate, i.e., (a) an SAXS pattern observed from the z-axis direction and (b) a graph plotting the scattering intensity of the sample against the scattering vector.

FIG. 12 shows results of an SAXS analysis performed on a sample crystallized by elongation at a supercritical elongation strain rate of 3×10$^3$ s$^{-1}$, which is not less than the critical strain rate, i.e., (a) an SAXS pattern observed from the z-axis direction and (b) a graph plotting the scattering intensity of the sample against the scattering vector.

(a) of FIG. 12 shows that molecule chains in the sample are oriented along the x-axis direction. This fact coincided with the results of the polarizing microscopic observation. Further, (b) of FIG. 12 shows a peak (indicated by the downward arrow "↓" in (b) of FIG. 12) at a small angle q=0.33 nm$^{-1}$. From these results, it was found that the sample crystallized by elongation at an elongation strain rate of 3×10$^3$ s$^{-1}$ has microcrystals oriented along the x-axis direction and scattered remarkably in disarray. Further, based on the result of (b) of FIG. 12 and the Bragg equation D=q, it was found that the crystal size D equals 19 nm. Further, based on the value of crystal size D (19 nm), it was found that the sample has a crystal number density of 1.5×10$^5$ µm$^{-3}$.

Figure 13:
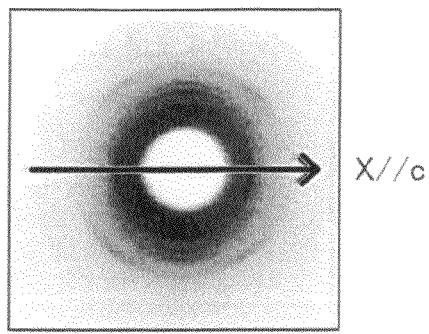
FIG. 13 shows results of a WAXS analysis performed on a sample crystallized by elongation at an elongation strain rate of $3\times10^3 \text{ s}^{-1}$, which is not less than the critical strain rate, i.e., (a) a WAXS pattern viewed from the z-axis direction, (b) a WAXS pattern viewed from the y-axis direction, and (c) a WAXS pattern viewed from the x-axis.
Figure 13:
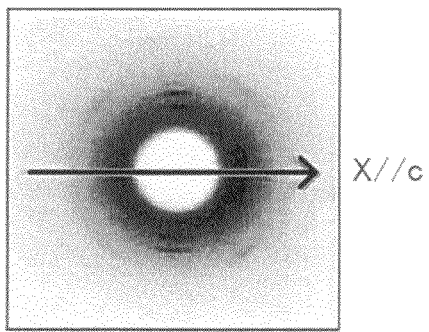
Figure 13:
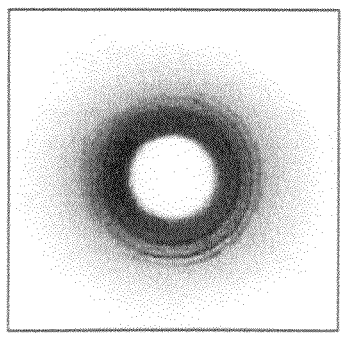

FIG. 13 shows results of a WAXS analysis performed on a sample crystallized by elongation at an elongation strain rate of 3×10$^3$ s$^{-1}$, which is not less than the critical strain rate, i.e., (a) a WAXS pattern viewed from the z-axis direction, (b) a WAXS pattern viewed from the y-axis direction, and (c) a WAXS pattern viewed from the x-axis direction.

FIG. 13 shows that (a) and (b) are oriented along c-axis and (c) is nonoriented. This result shows that molecular chains in the sample crystallized by elongation at 3×10$^3$ s$^{-1}$, which is not less than the critical strain rate, are oriented along the x-axis direction.

Figure 14:
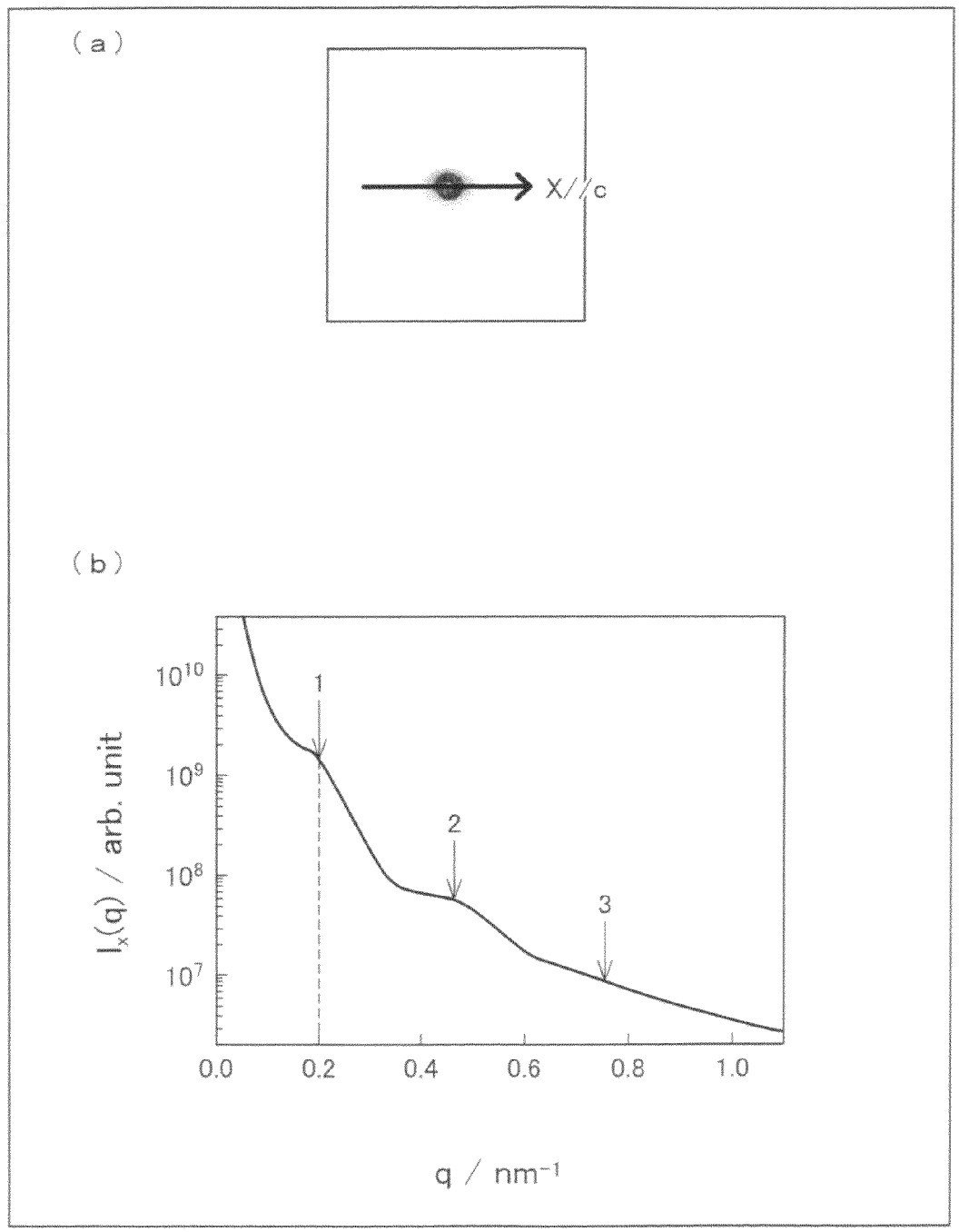
FIG. 14 shows results of an SAXS analysis performed on a sample crystallized by elongation at an elongation strain rate of $3 \text{ s}^{-1}$, which is less than the critical strain rate, i.e., (a) an SAXS pattern observed from the z-axis direction and (b) a graph plotting the scattering intensity of the sample against the scattering vector.

Meanwhile, FIG. 14 shows results of an SAXS analysis performed on a sample crystallized by elongation at an elongation strain rate of 3 s$^{-1}$, which is less than the critical strain rate, i.e., (a) an SAXS pattern observed from the z-axis direction and (b) a graph plotting the scattering intensity of the sample against the scattering vector.

(a) of FIG. 14 shows that molecular chains in the sample are oriented along the x-axis direction. Further, (b) of FIG. 14 shows first, second, and third peaks (indicated by the downward arrows "↓1", "↓2", and "↓3", respectively, in (b) of FIG. 14). From these results, it was found that the sample crystallized by elongation at an elongation strain rate of 3 s$^{-1}$ is a laminated lamellar crystalline substance, oriented along the x-axis direction, which exhibits a typical long-period structure. Since the first peak was found at a small angle q of 0.2 nm$^{-1}$, it was found from Long Period=2π÷q that the long period≈30 nm.

Further, also from a WAXS pattern of the sample crystallized by elongation at an elongation strain rate of 3 s$^{-1}$, it was found that molecular chains in the sample are oriented along the x-axis direction. Therefore, it was found that the molecular chains are perpendicular to the lamellar end face.

Figure 15:
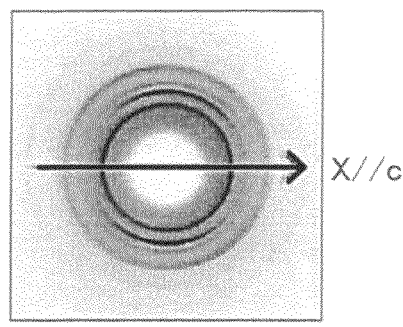
FIG. 15 shows a WAXS pattern of a sample crystallized by elongation at an elongation strain rate of $3 \text{ s}^{-1}$, viewed from the z-axis direction.

FIG. 15 shows, as a representative example of the results, a WAXS pattern of the sample as viewed from the z-axis direction.

Figure 16:
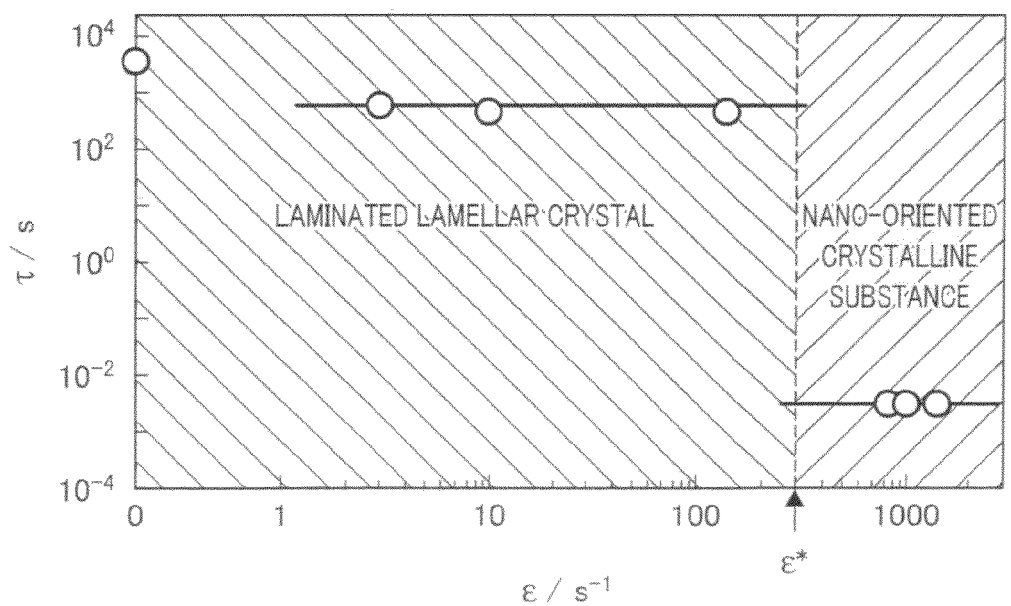
FIG. 16 shows a relationship between the elongation strain rate c and the waiting time ($\tau$) required for the formation of a crystal.

FIG. 16 shows a relationship between the elongation strain rate $\epsilon$ and the time (τ) required for the formation of a crystal. FIG. 16 shows that τ becomes remarkably shorter at an elongation strain rate $\epsilon$ of 3×10$^2$ s$^{-1}$ or greater. Therefore, it was found that the critical elongation strain rate $\epsilon$* in the present example is 3×10$^2$ s$^{-1}$.

From these results, it was confirmed that oriented polymer crystalline materials (polymer crystalline materials according to the present invention) was obtained by elongation crystallization at a supercritical strain rate.

Comparative Example 1

Methods

For comparison with the properties of the highly crystalline polypropylene of Example 2, the crystal size, crystal number density, tensile strength, Young's modulus, transparency (haze, thickness of 10 µm), and allowable temperature limit (2% contraction) of a biaxially-stretched polypropylene sheet (iPP, $M_w$=42×10$^4$, $M_w/M_n$=7, MFR=2.5, longitudinal draw ratio of 6, transverse draw ratio of 6, elongation temperature $T_d$=155° C., thickness of 10 µm) were measured. Except for the haze, the properties were measured as described in Example 2. The haze was measured in conformity to JIS K7136.

The measurement of the crystallinity $\chi_c$ by the WAXS method was performed as described in Example 2. For comparison of crystallinity $\chi_c$, a sample crystallized at rest was used. The sample crystallized at rest was iPP having $M_w$=33.5×10$^4$ and $M_w/M_n$=30 (equilibrium melting point $T_m^0$=187.4° C.). The iPP with the dimensions 5 mm (long)×5 mm (wide)×0.1 mm (thick) was sandwiched between glass covers. In this condition, the iPP was melted at T=192.0° C. for three minutes. Next, the iPP melt was cooled at a cooling rate of 30° C./min and crystallized by isothermal elongation at a crystallization temperature $T_c$ of 150° C. (supercooling degree ΔT of 37.4 K) for 51 hours. The properties of the sample thus crystallized were measured at room temperature (22° C.).

In order to measure the crystallinity $\chi_c$, wide-angle X-ray scattering intensity was used. The crystallinity $\chi_c$ is calculated as follows (see I. Nitta, *Ekkusu-sen Kessyogaku* (X-ray Crystallography), Maruzen Co., Ltd., 1959, p. 588) (see *Ekkusu-sen Kaisetsu no Tebiki* (Handbook for X-ray Diffraction), Revised 3rd Edition, Rigaku Corporation, 1996, p. 84):

$$\chi_c = 1 - (I_a \div I_a^0)$$

where $I_a$ is the integrated scattering intensity of amorphous contained in the sample and $I_a^0$ is the integrated scattering intensity of a 100% amorphous sample (i.e., having a crystallinity of 0%). The term "integrated scattering intensity" here means the integral of the wide-angle X-ray intensity $I_x$ with respect to the scattering vector q. The range of integration is q=5-40 nm$^{-1}$. The wide-angle X-ray intensities $I_x$ of samples of the same mass were standardized for absolute comparison. It should be noted here that the wide-angle X-ray intensity ($I_x$) of the 100% amorphous sample at room temperature (22° C.) was obtained by thermal expansion correction (see F. Gu, M. Hikosaka et al., *Polymer,* 43, 2002, p. 1473-1481) of the wide-angle X-ray scattering intensity of the iPP melt at T=230° C.

[Results]

Figure 18:
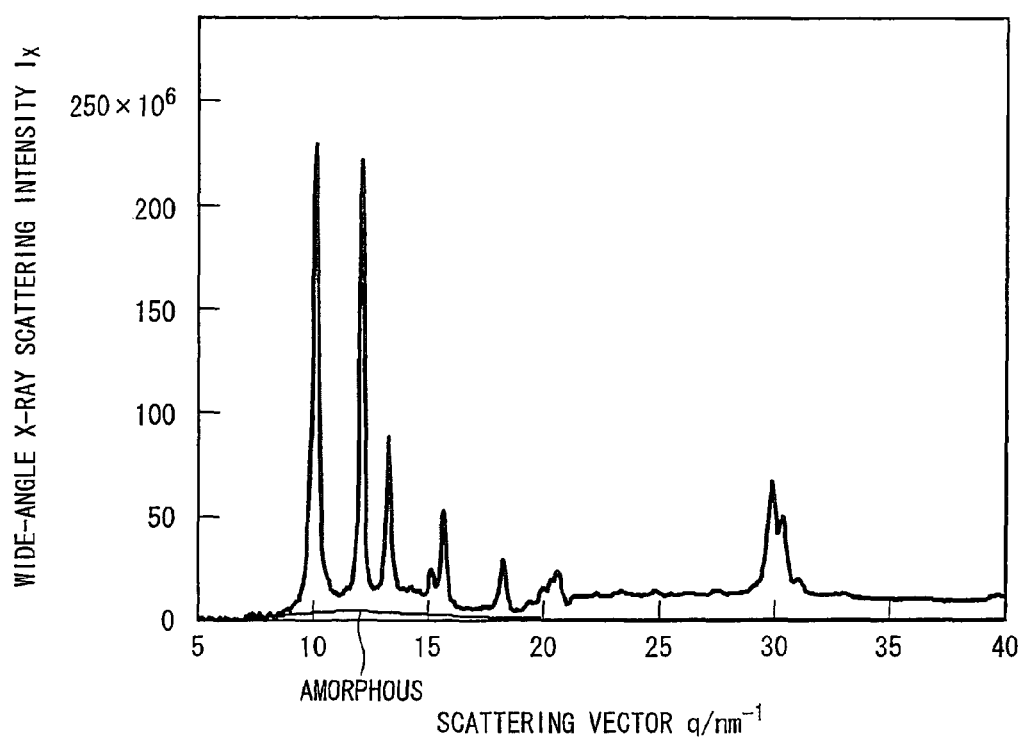
FIG. 18 is a graph showing a result of WAXS measurement of the crystallinity of a sample of Example 2 and plotting the scattering intensity against the scattering vector (q).
Figure 19:
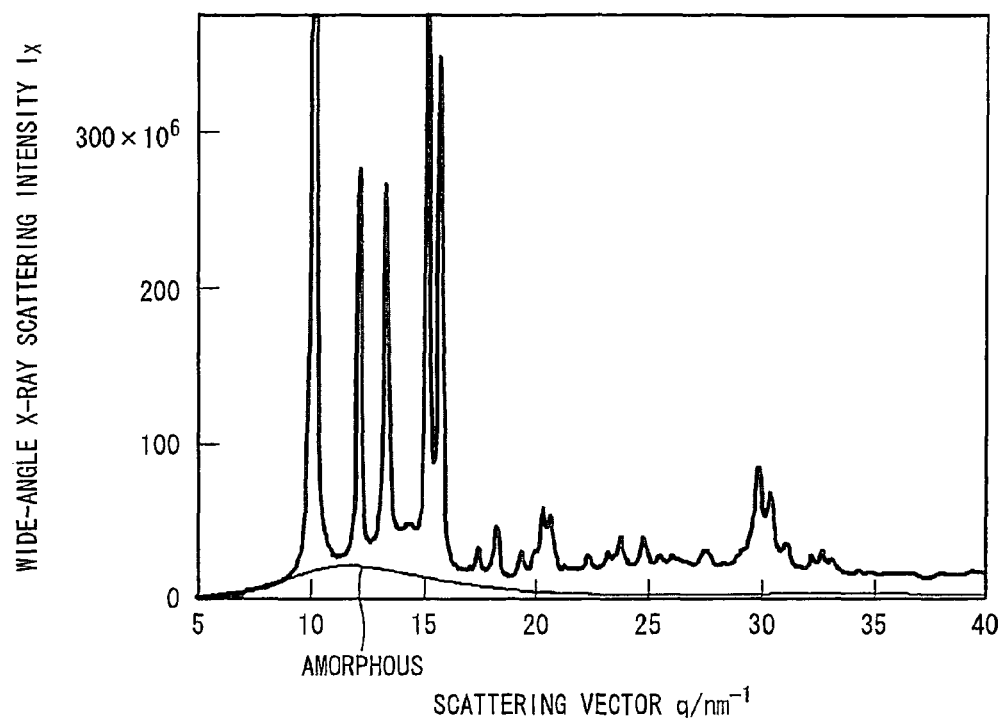
FIG. 19 is a graph showing a result of WAXS measurement of the crystallinity of a sample crystallized at rest and plotting the scattering intensity against the scattering vector (q).

FIGS. 18 and 19 show the results of measurement of the crystallinity of the sample of Example 2 and the crystallinity of the sample crystallized at rest in Comparative Example 1, respectively. FIGS. 18 and 19 are graphs plotting the scattering intensities of the respective samples against the scattering vector (q). From the result shown in FIG. 18, it was found that the sample of Example 2 has a crystallinity $\chi_c$ of 0.9 (i.e., 90%). Meanwhile, from the result shown in FIG. 19, it was found that the sample crystallized at rest in Comparative Example 1 has a crystallinity $\chi_c$ of 0.5 (i.e., 50%). In the case of a biaxially-stretched polypropylene sheet, it is publicly known that the crystallinity $\chi_c$ is 0.5 to 0.7 (i.e., 50 to 70%) (see T. Yamada and T. Kanai et al., *Firumu Seimaku Enshin no Saitekika to Toraburu Taisaku* (Optimization and Troubleshooting for Film Formation and Elongation), Chapter 4, Section 2 Crystallinity Evaluation Method, Technical Information Institute Co., Ltd., 2007). These results show that the sample of Example 2 is much higher in crystallinity than the sample crystallized at rest in Comparative Example 1 and the biaxially-stretched polypropylene sheet.

Figure 20:
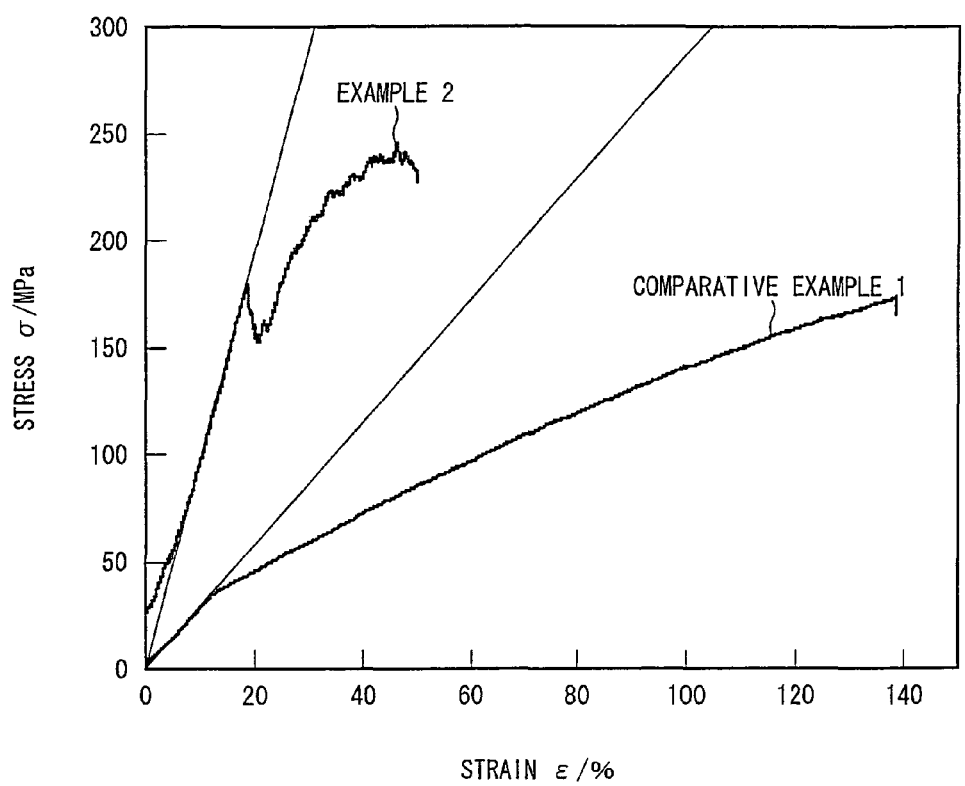
FIG. 20 shows results of measurement of the tensile strength and Young's modulus of the sample of Example 2 and those of a sample of Comparative Example 1 (biaxially-stretched polypropylene sheet).

FIG. 20 shows a result of comparison between the tensile strength and Young's modulus of the sample of Example 2 and those of the sample of Comparative Example 1 (biaxially-stretched polypropylene sheet). From FIG. 20, it was found that Example 2 has a tensile strength of 240 MPa or greater (i.e., 0.24 GPa or greater) and a Young's modulus of 1.4 GPa, and that Comparative Example 1 (biaxially-stretched polypropylene sheet) has a tensile strength of 180 MPa or greater (i.e., 0.18 GPa or greater) and a Young's modulus of 0.4 GPa. From this result, it was found that the sample of Example 2 is superior in mechanical strength to the biaxially-stretched polypropylene sheet of Comparative Example 1. It should be noted that the Young's moduli were each calculated from the slope of a line tangent to the corresponding curve.

Figure 21:
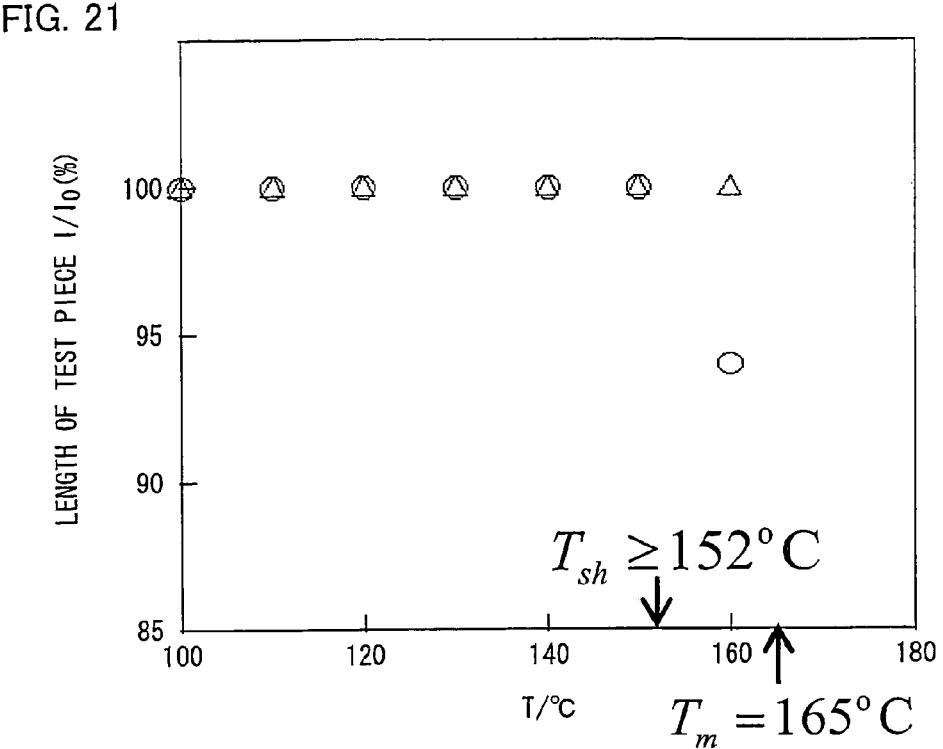
FIG. 21 shows a result of measurement of the allowable temperature limit of the sample of Example 2.
Figure 22:
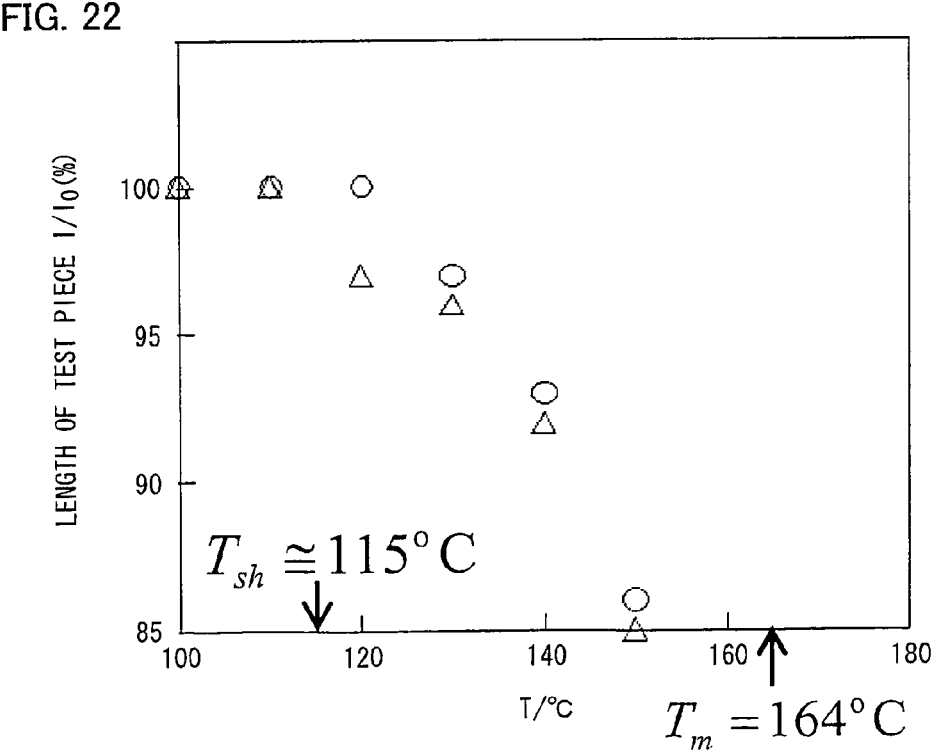
FIG. 22 shows a result of measurement of the allowable temperature limit of the sample of Comparative Example 1 (biaxially-stretched polypropylene sheet).

FIGS. 21 and 22 show results of measurement of the allowable temperature limit of the sample of Example 2 and the allowable temperature limit of the sample of Comparative Example 1 (biaxially-stretched polypropylene sheet), respectively. FIG. 21 shows that Example 2 has an allowable temperature limit (2% contraction) of 152° C. or greater, and FIG. 22 shows that Comparative Example 1 (biaxially-stretched polypropylene sheet) has an allowable temperature limit (2% contraction) of 115° C. or greater. From this result, it was found that the sample of Example 2 is higher in heat tolerance than the biaxially-stretched polypropylene sheet of Comparative Example 1. In each of FIGS. 21 and 22, the symbols "○" indicate the size of the sample along the MD (machine direction), and the symbols "Δ" indicate the size of the sample along the TD (transverse direction). Further, in each of FIGS. 21 and 22, "$T_{sh}$" indicates the allowable temperature limit of the sample, and "$T_m$" indicates the melting point of the sample.

Figure 23:
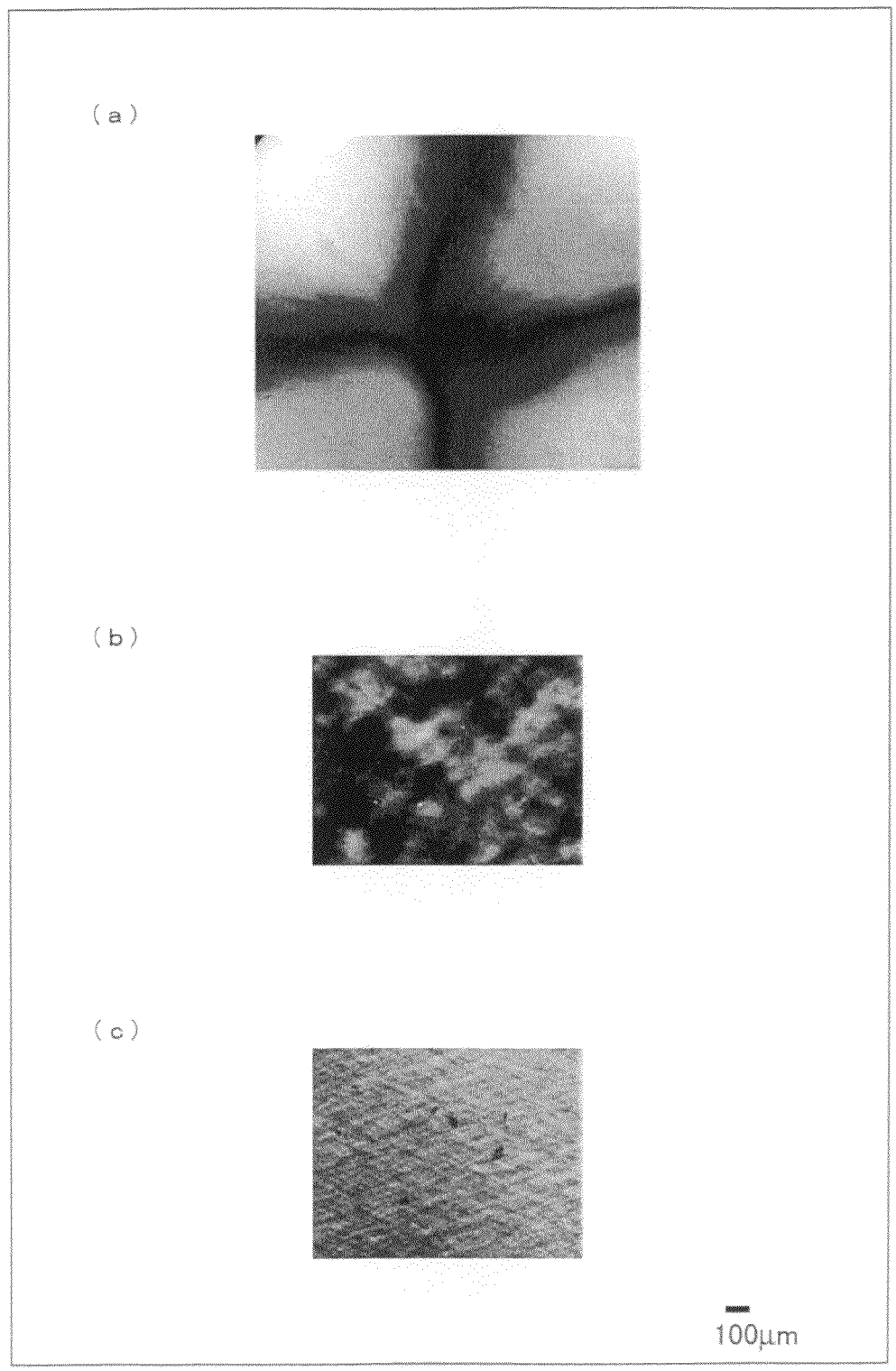
FIG. 23 shows (a) a result of polarizing microscopic observation of Example 2, (b) a result of polarizing microscopic observation of Comparative Example 1 (biaxially-stretched polypropylene sheet), and (c) a result of polarizing microscopic observation of a biaxially-stretched polypropylene product (commercially available transparent cover).

FIG. 23 shows (a) a result of polarizing microscopic observation of Example 2, (b) a result of polarizing microscopic observation of Comparative Example 1 (biaxially-stretched polypropylene sheet), and (c) a result of polarizing microscopic observation of a biaxially-stretched polypropylene product (commercially available transparent cover). In FIG. 23, whereas crystal grains are observed in Comparative Example 1 (biaxially-stretched polypropylene sheet) and the biaxially-stretched polypropylene product (commercially available transparent cover), no crystal grains are observed in the sample of Example 2. This shows that the sample of Example 2 is extremely fine in crystal size.

Table 2 tabulates the measured values of crystallinity, crystal size, crystal number density, tensile strength, Young's modulus, transparency (haze, thickness of 10 μm) and allowable temperature limit (2% contraction). The data on haze show that the polymer crystalline materials of the present invention are extremely high in transparency.

TABLE 2

|  | Example 2 | Comparative Example 1 Biaxially-stretched polypropylene sheet |
|---|---|---|
| Tensile strength | 0.24 GPa | 0.18 GPa |
| Young's modulus | 1.4 GPa | 0.4 GPa |
| Allowable temperature limit (2%) | 152° C. or greater | 115° C. |
| Crystallinity | 0.9 | 0.5-0.7 |
| Transparency (haze, thickness of 10 μm) | 0.2 | 0.5 |

Finally, Table 3 shows the results of qualitative comparison between the polymer crystalline materials of the present invention and a conventional molded article such as biaxially-stretched polypropylene. According to Tables 2 and 3, it can be easily understood that the polymer crystalline materials of the present invention are far superior to the conventional molded article such as biaxially-stretched polypropylene.

TABLE 3

|  | Polymer crystalline materials of the present invention | Conventional molded article |
|---|---|---|
| Solid structure, form | Nanocrystals strung three-dimensionally on a polymer chain | Laminated structure of a folded chain crystal and amorphous |
| Basic size of the above | Several tens of nm (nano) | Tens of μm or larger (bulky) |
| Nucleation mechanism | Homogenous nucleation No nucleating agent required | Heterogeneous nucleation Nucleating agent required |
| Time required for solidification (150° C.) | 1 ms or less | 1 hour |
| Melt structure | Oriented melt | Isotropic melt |

As described above, the present invention makes it possible to provide polymer crystalline materials excellent in properties such as mechanical strength, heat tolerance, and transparency. The polymer crystalline materials of the present invention have such features as being high in crystallinity and crystal number density, remarkably small in crystal size, excellent in mechanical strength such as tensile strength and Young's modulus, and remarkably excellent in heat tolerance and transparency in comparison with conventional publicly-known unstretched polymer crystalline materials and a uniaxially- or biaxially-stretched polymer molded article. This makes it possible to use general-purpose plastics as alternatives to engineering plastics and thereby drastically reduce costs of various industrial products made of polymers. Further, the present invention can make polymers equivalent in strength to metal, thus making it possible to use the bulk polymer crystalline materials as an alternative to metal. The bulk polymer crystalline materials are very lighter in weight than metal (i.e., one eighth of the weight of metal). Therefore, if the bulk polymer crystalline materials replace metal as interior and/or exterior materials for a vehicle, the weight of the vehicle can be reduced to one-severalth. This makes it possible to significantly improve fuel efficiency, contributing to significant energy saving.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

As described above, the present invention makes it possible to produce oriented polymer crystalline materials. This makes it possible to use general-purpose plastics as alternatives to engineering plastics and thereby achieve large reductions in cost of various industrial products made of polymers. Further, the present invention can make polymers equivalent in strength to metals, thus making it possible to use the oriented polymer crystalline materials as an alternative to metal.

Therefore, the present invention can be used not only in various industries handling parts made of polymers but also industries handling parts made of metal.

The invention claimed is:

1. Bulk oriented polymer crystalline materials comprising crystals of the polymer and satisfying the following requirements (I) and (II):
   (I) the bulk oriented polymer crystalline materials have a crystallinity of 80% or greater; and
   (II) the crystals are 100 nm or less in size,
   wherein the crystallinity $X_c$ is calculated using following Equation (1)

$$X_c = 1 - (I_a/I_a^0)$$ Equation (1)

where $I_a$ is an integrated scattering intensity of amorphous contained in a sample and $I_a^0$ is an integrated scattering intensity of a 100% amorphous sample, the 100% amorphous sample having a crystallinity of 0%, and
   wherein said bulk oriented polymer crystalline materials are obtained by a production method including the steps of (i) putting a polymer melt in an oriented melt state by elongating the polymer melt at a strain rate of 400 s$^1$ or greater which is greater than a critical elongation strain rate of 150 s$^{-1}$, and (ii) crystallizing the polymer melt while keeping the polymer melt in the oriented melt state.

2. The bulk oriented polymer crystalline materials as set forth in claim 1, said bulk oriented polymer crystalline materials having a tensile strength of 0.18 GPa or greater, measured by:
   a tensile testing method, said method being carried out by stretching a sample at a tensile rate of 0.3 mm/sec at 22° C. with use of a Shimadzu's precision universal tester (Autograph AG-1kNIS); and
   a Young's modulus of 1 GPa or greater.

3. The bulk oriented polymer crystalline materials as set forth in claim 1, said bulk oriented polymer crystalline materials having a tensile strength of 0.2 GPa or greater, measured by:
   a tensile testing method, said method being carried out by stretching a sample at a tensile rate of 0.3 mm/sec at 22° C. with use of a Shimadzu's precision universal tester (Autograph AG-1kNIS); and
   a Young's modulus of 1.2 GPa or greater.

4. The bulk oriented polymer crystalline materials as set forth in claim 1, said bulk oriented polymer crystalline materials having a haze (thickness of 10 μm) of 0.25 or less, measured by a transmitted light intensity measurement method, said transmitted light intensity measurement method being performed by measuring an amount of light transmitted through a 10-μm-thick test piece.

5. The bulk oriented polymer crystalline materials as set forth in claim 4, said bulk oriented polymer crystalline materials having a haze (thickness of 10 μm) of 0.20 or less, measured by the transmitted light intensity measurement method.

6. The bulk oriented polymer crystalline materials as set forth in claim 1, wherein the polymer is one selected from polyethylene, polypropylene, polystyrene and polyvinyl chloride.

7. The bulk oriented polymer crystalline materials as set forth in claim 1, wherein the polymer is polypropylene.

8. The bulk oriented polymer crystalline materials as set forth in claim 7, said bulk oriented polymer crystalline materials having an allowable temperature limit of 135° C. or greater, said allowable temperature limit being a temperature at which, when a test piece with the dimensions 1 mm (long)×1 mm (wide)×15 μm (thick) heated at a temperature rising rate of 1 K/min, the test piece is contracted by 2% in a longitudinal direction or in a transverse direction, measured by a method for directly reading size of a test piece.

9. The bulk oriented polymer crystalline materials as set forth in claim 1, wherein the polymer melt is one selected from polyethylene, polypropylene, polystyrene and polyvinyl chloride.

10. The bulk oriented polymer crystalline materials as set forth in claim 1, wherein the polymer melt is a polypropylene melt.

11. The bulk oriented polymer crystalline materials as set forth in claim 1, wherein the polymer melt is an isotactic polypropylene melt.

12. A molded article, comprising:
    bulk oriented polymer crystalline materials as set forth in claim 1.

13. An extrusion molded article, comprising:
    bulk oriented polymer crystalline materials as set forth in claim 1.

14. An injection molded article, comprising:
    bulk oriented polymer crystalline materials as set forth in claim 1.

15. A blow molded article, comprising:
    bulk oriented polymer crystalline materials as set forth in claim 1.

16. A fiber, comprising: bulk oriented polymer crystalline materials as set forth in claim 1.

* * * * *